May 10, 1927.  
L. TRIOLO  
1,627,874  
BOX MAKING MACHINE AND THE METHOD OF MAKING BOXES  
Filed April 4, 1925  15 Sheets-Sheet 1
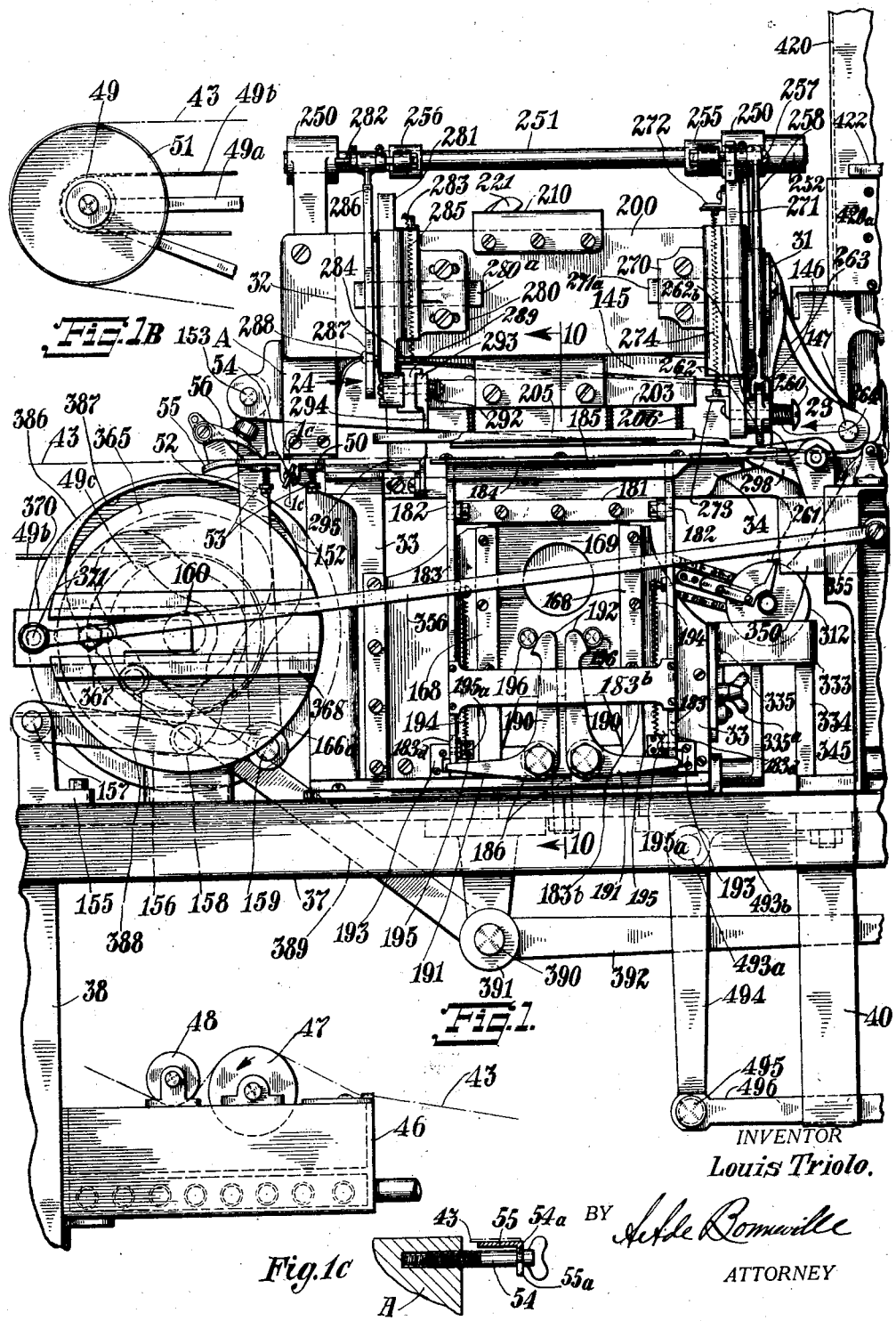
INVENTOR  
Louis Triolo.  
BY  
ATTORNEY

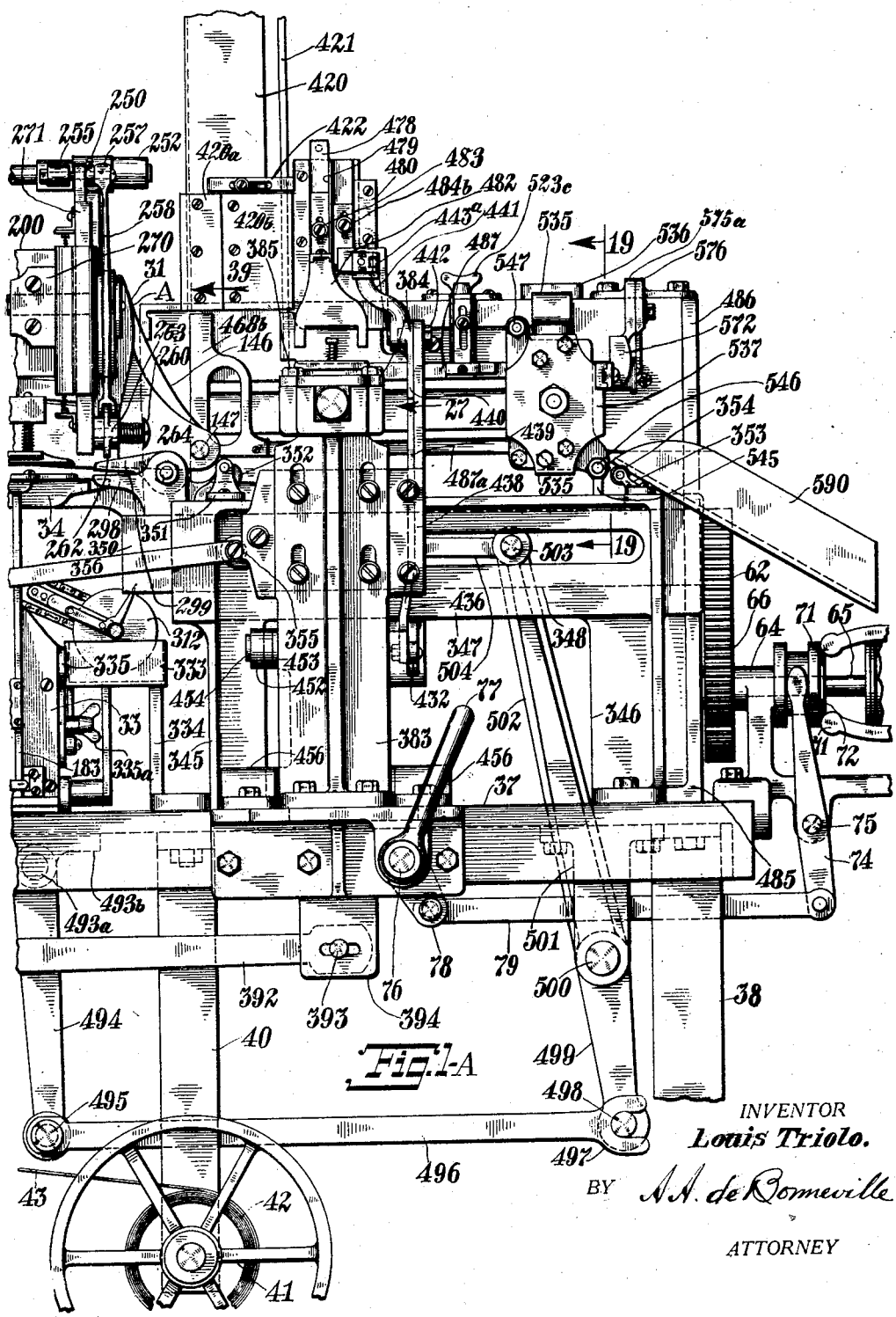

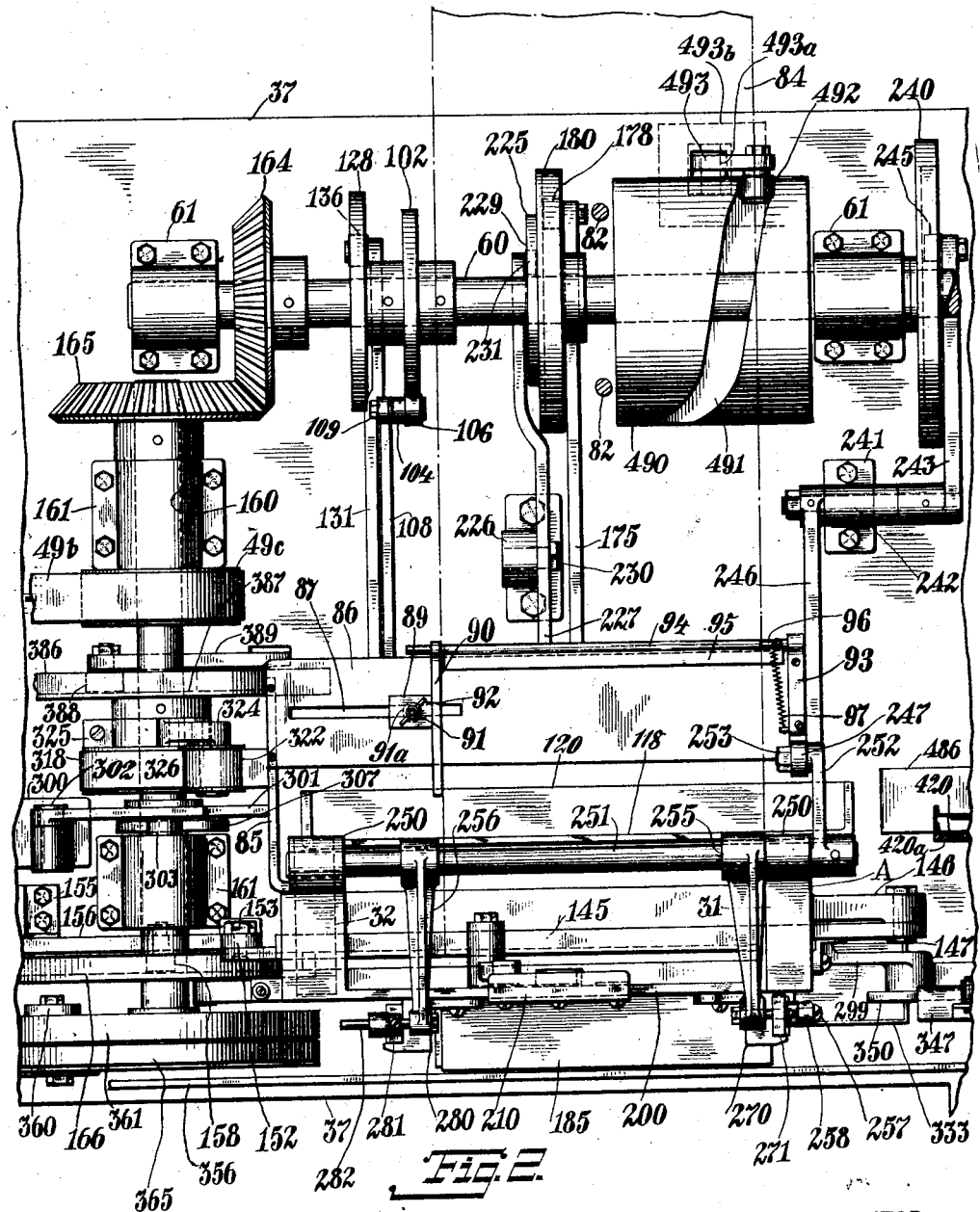

May 10, 1927.  L. TRIOLO  1,627,874
BOX MAKING MACHINE AND THE METHOD OF MAKING BOXES
Filed April 4. 1925   15 Sheets-Sheet 4

INVENTOR
Louis Triolo.
BY
ATTORNEY

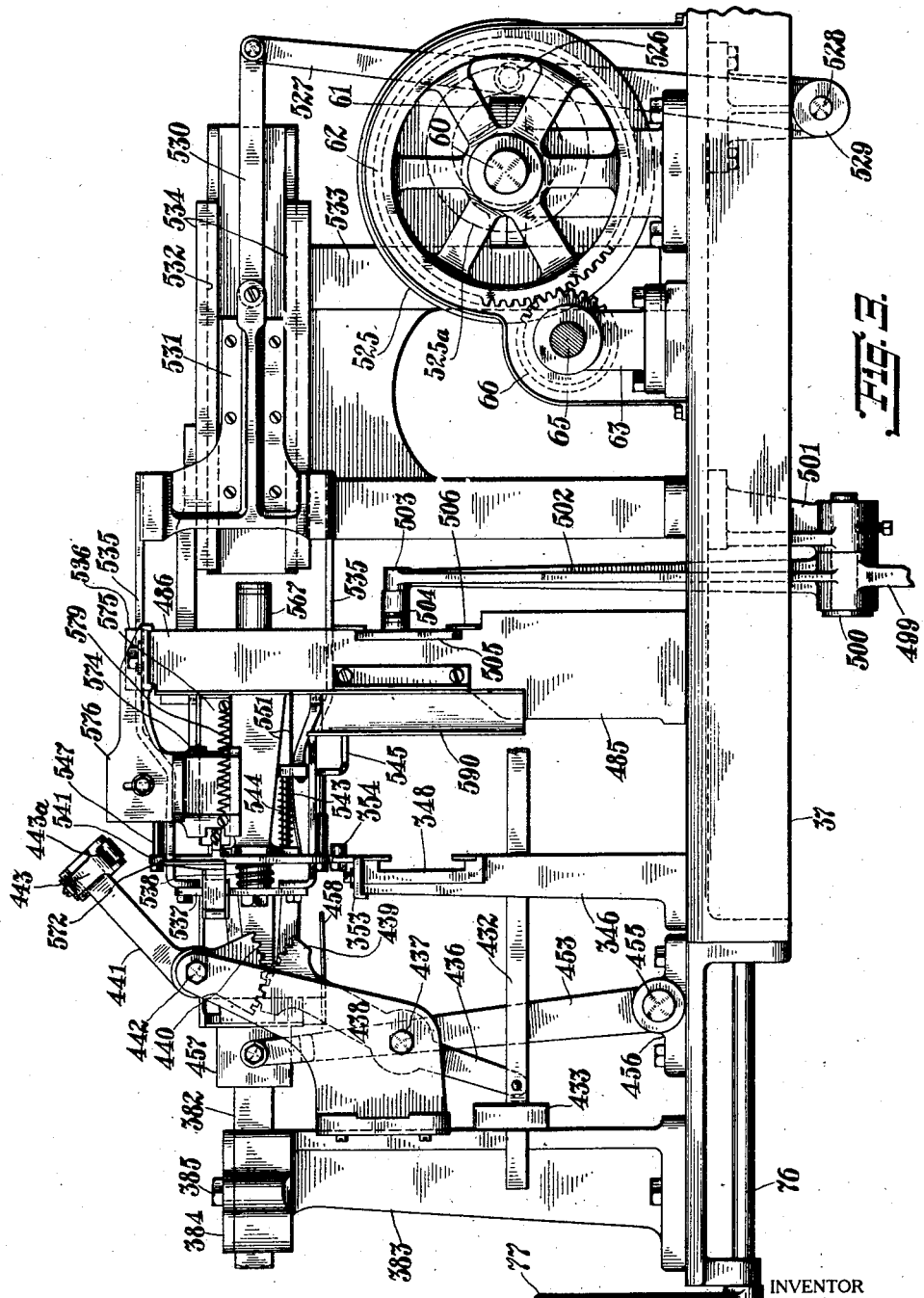

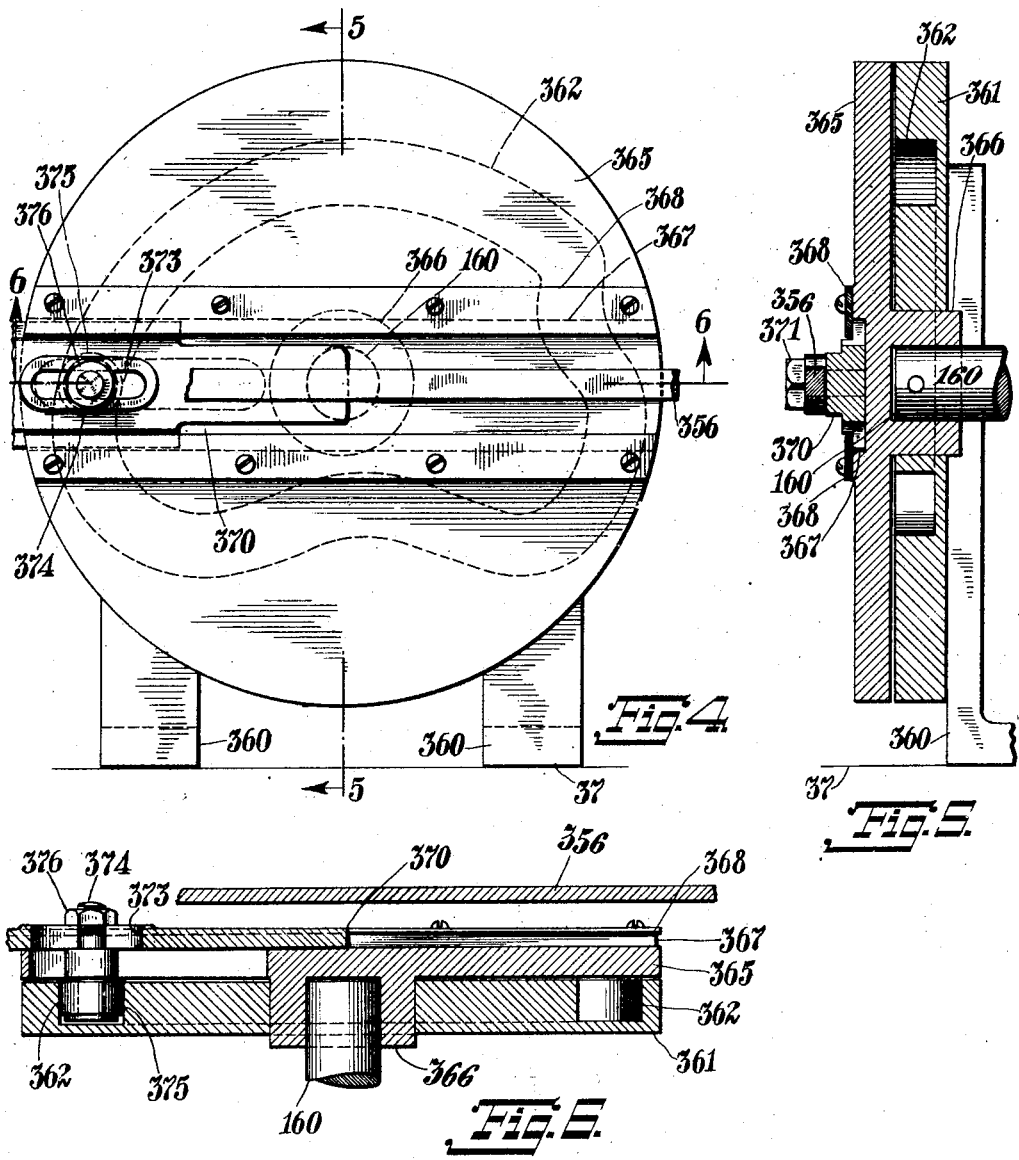

May 10, 1927. 1,627,874
L. TRIOLO
BOX MAKING MACHINE AND THE METHOD OF MAKING BOXES
Filed April 4, 1925    15 Sheets-Sheet 7
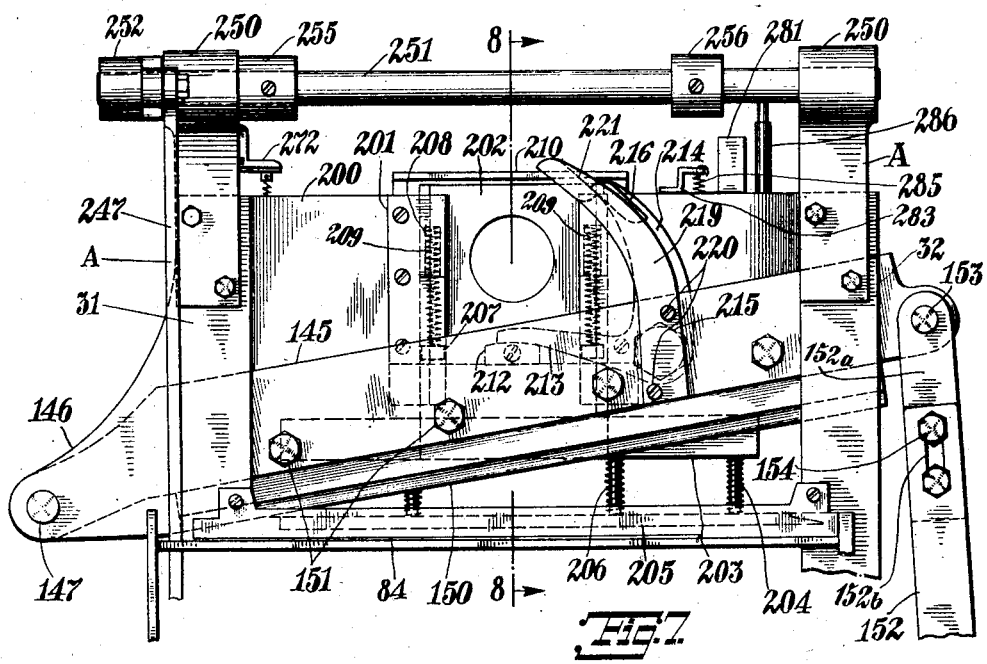
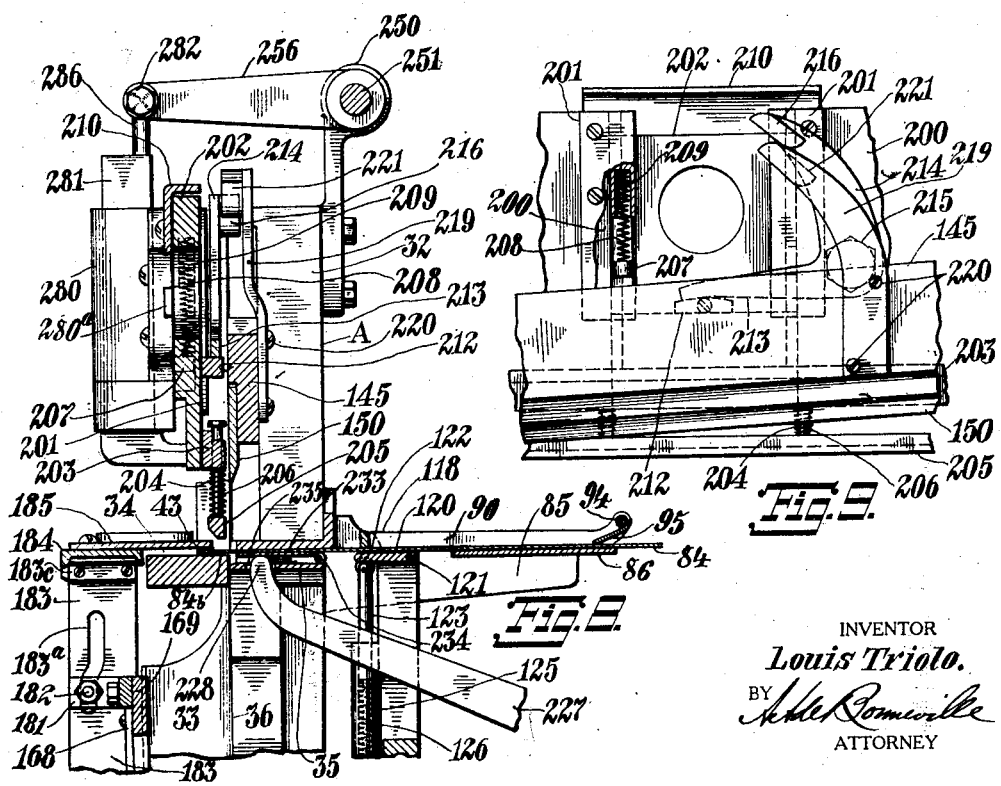
INVENTOR
Louis Triolo.
BY
ATTORNEY May 10, 1927.　　　　　　　　1,627,874
L. TRIOLO
BOX MAKING MACHINE AND THE METHOD OF MAKING BOXES
Filed April 4, 1925　　　15 Sheets-Sheet 8
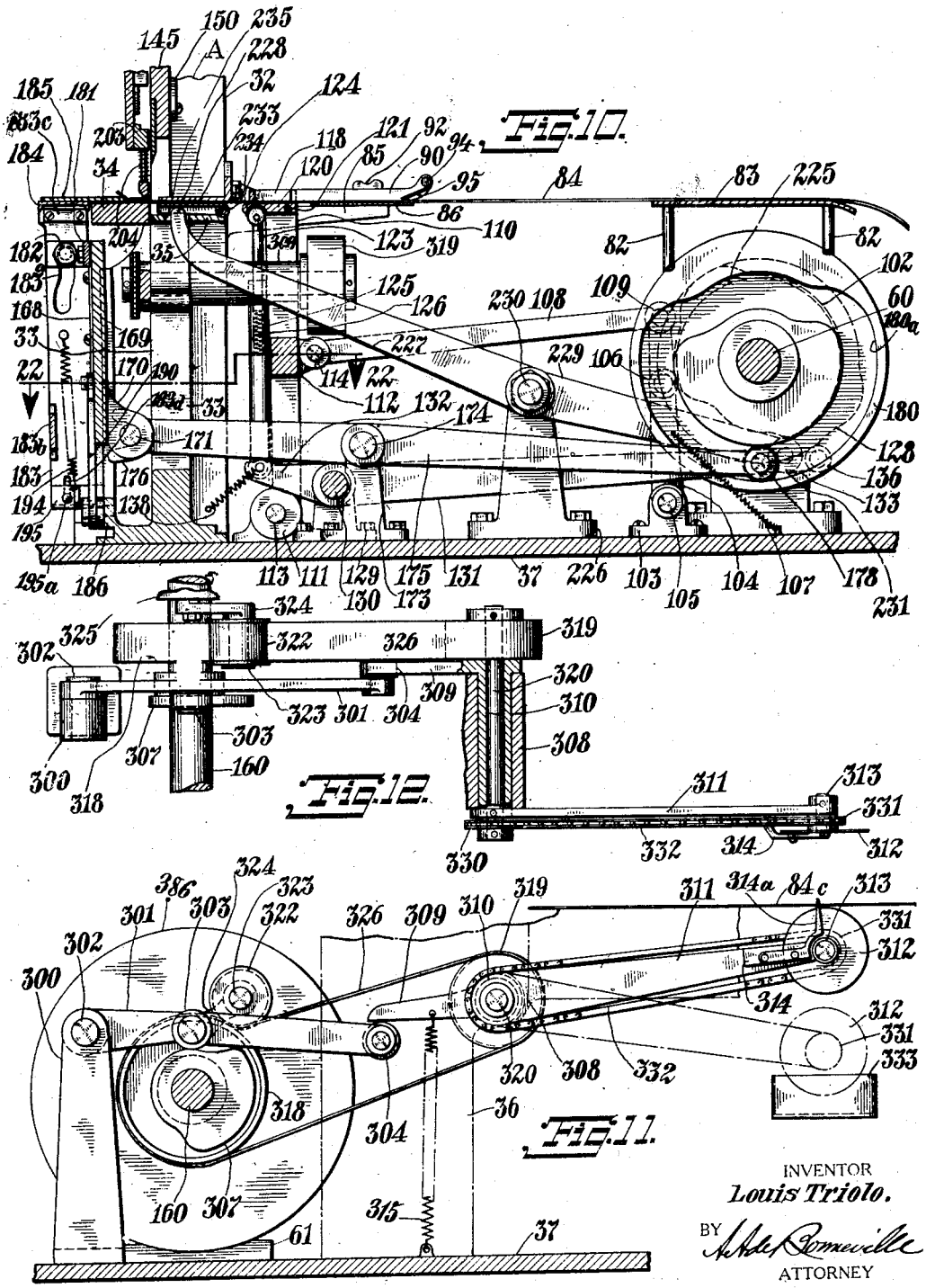
INVENTOR
*Louis Triolo.*
BY
ATTORNEY

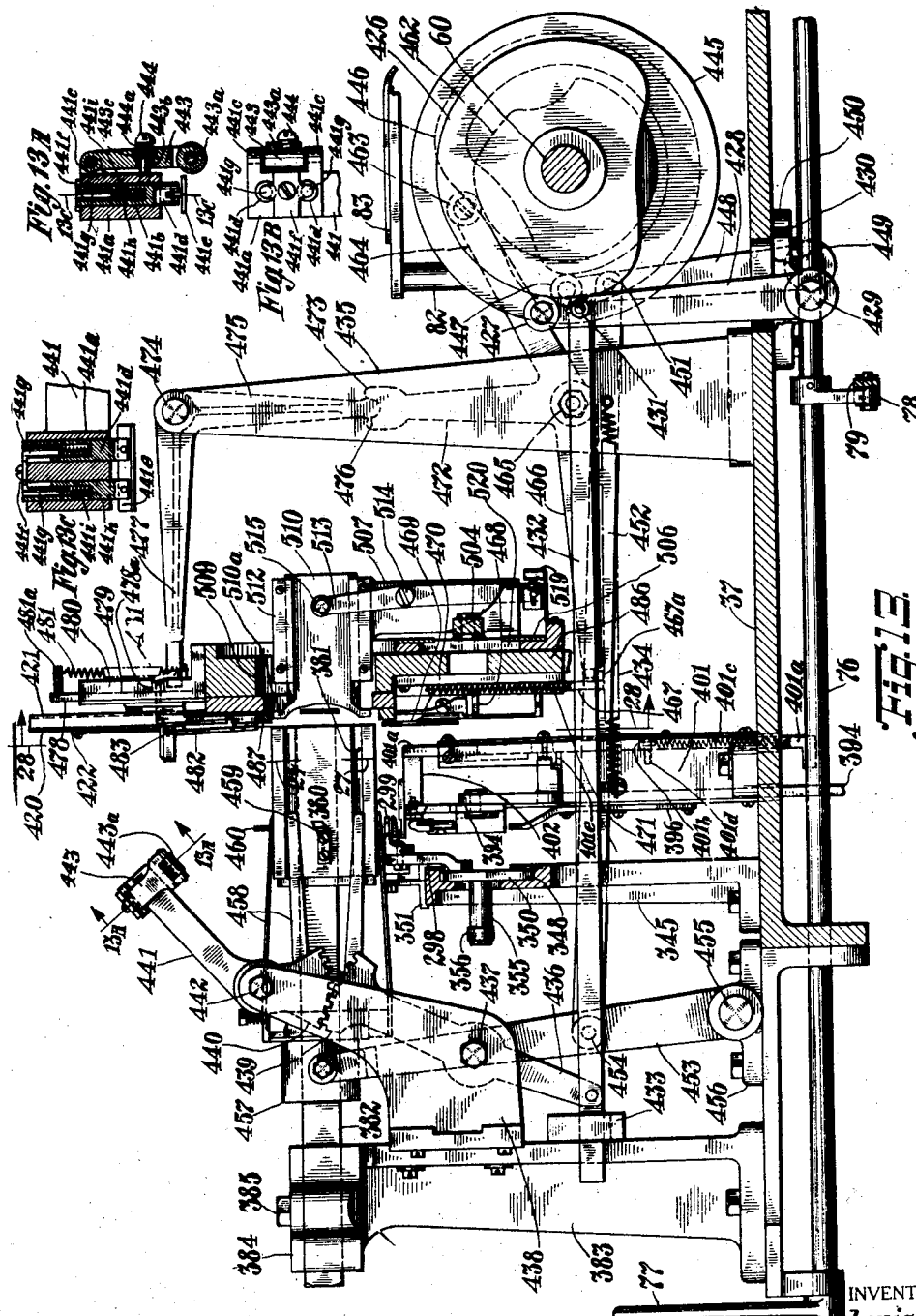
May 10, 1927.
L. TRIOLO
1,627,874
BOX MAKING MACHINE AND THE METHOD OF MAKING BOXES
Filed April 4. 1925 15 Sheets-Sheet 9
INVENTOR
*Louis Triolo.*
BY
ATTORNEY

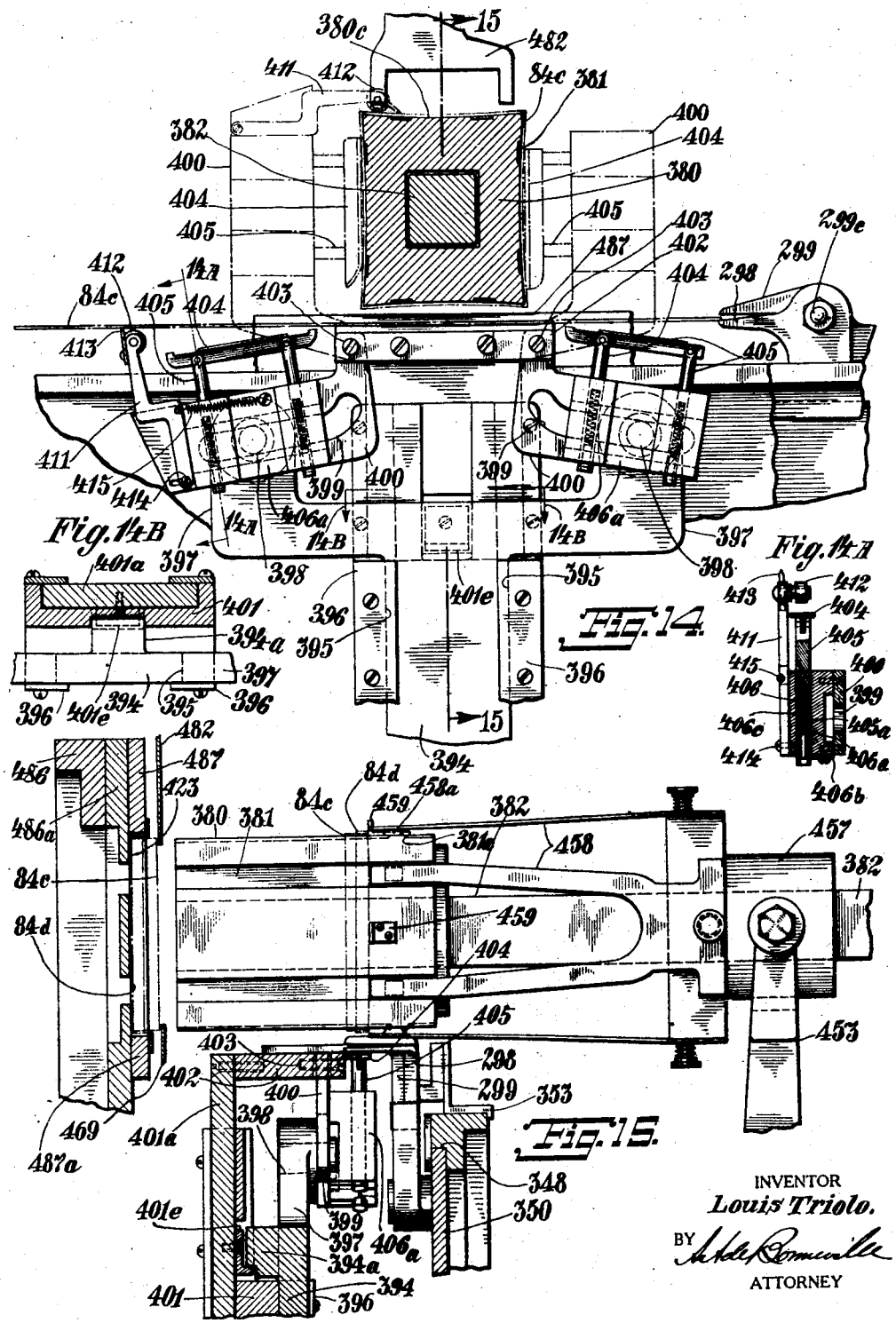

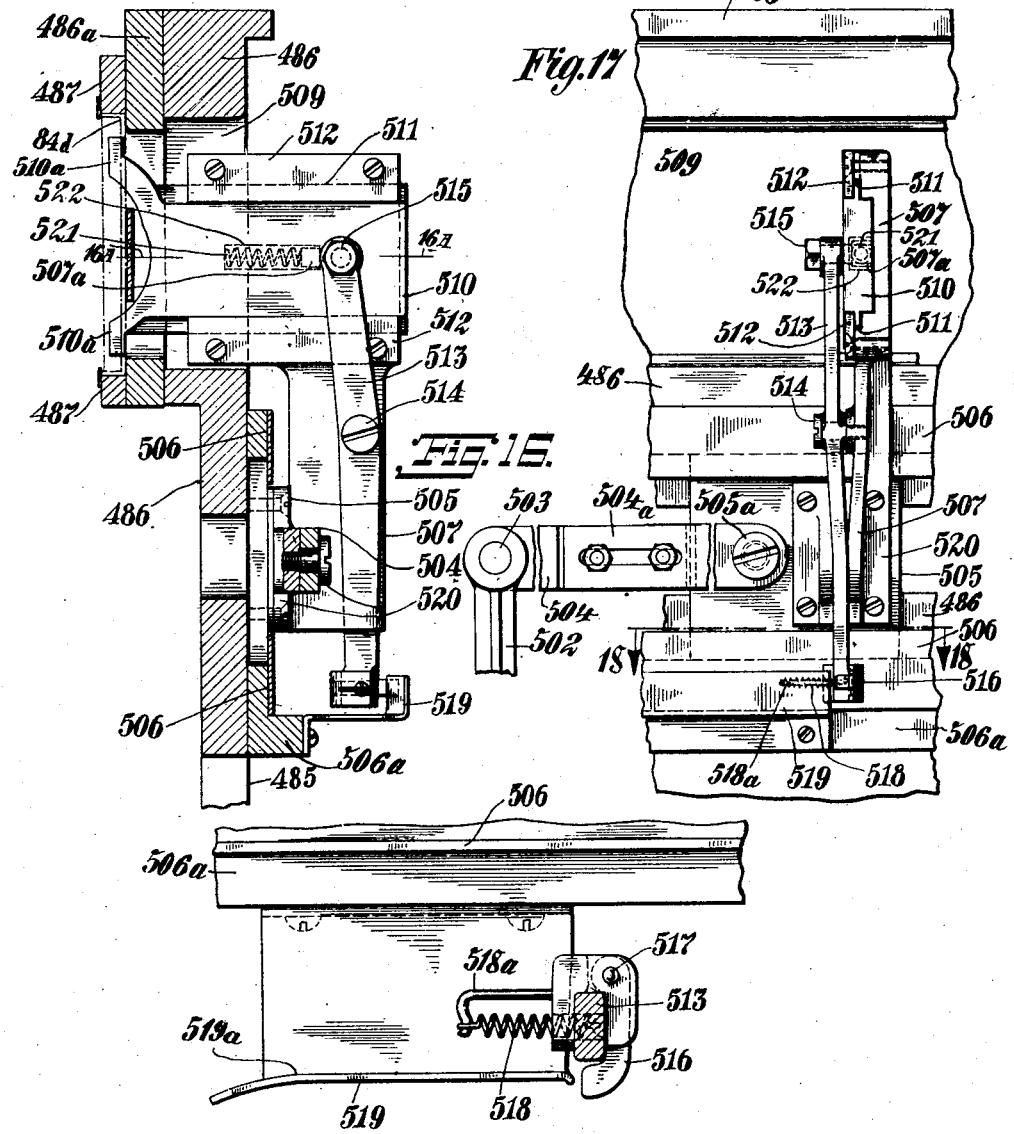

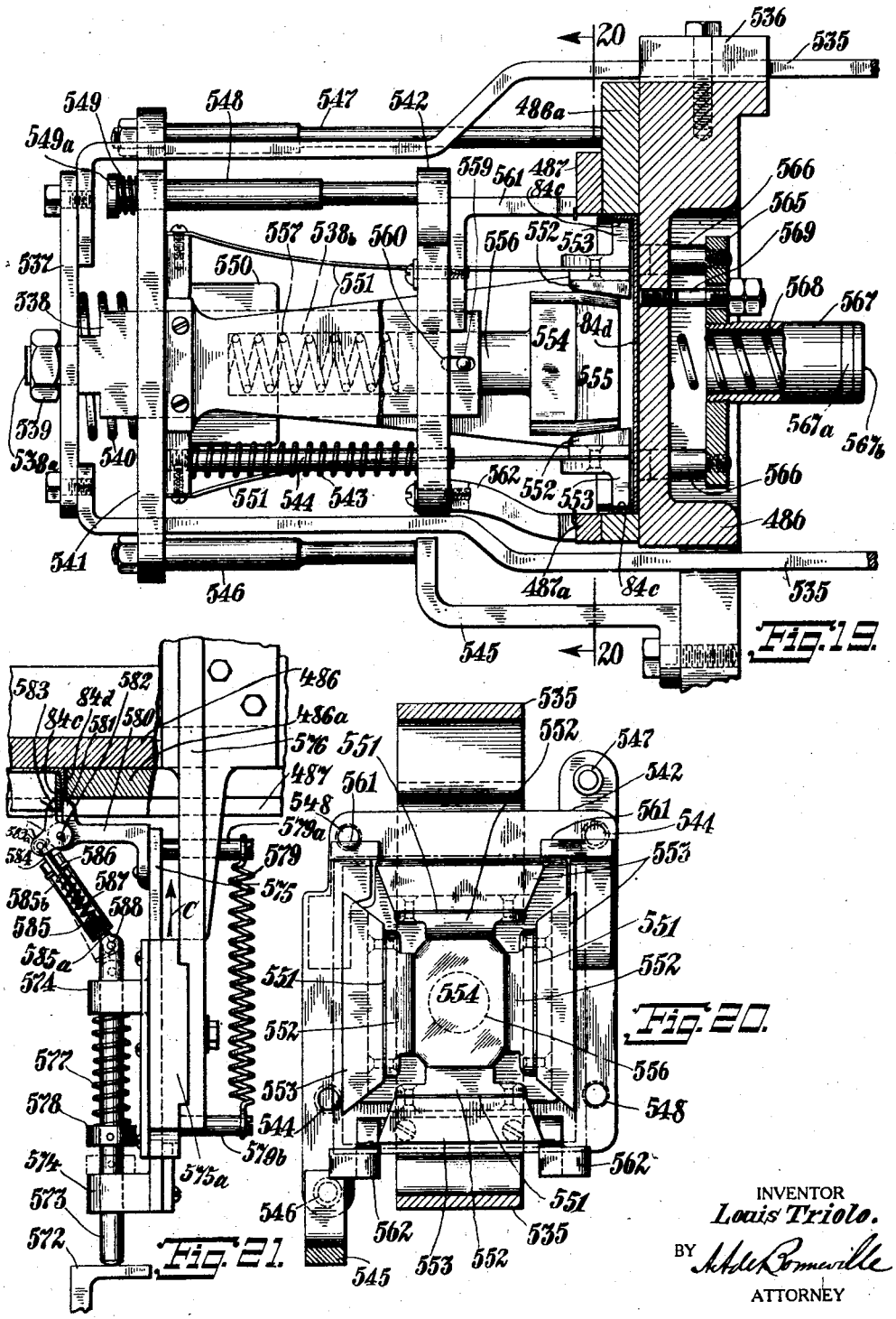

May 10, 1927.　　　　　　　　　　　　　　　　　　　1,627,874
L. TRIOLO
BOX MAKING MACHINE AND THE METHOD OF MAKING BOXES
Filed April 4, 1925　　　　15 Sheets-Sheet 13

INVENTOR
Louis Triolo.
BY
ATTORNEY

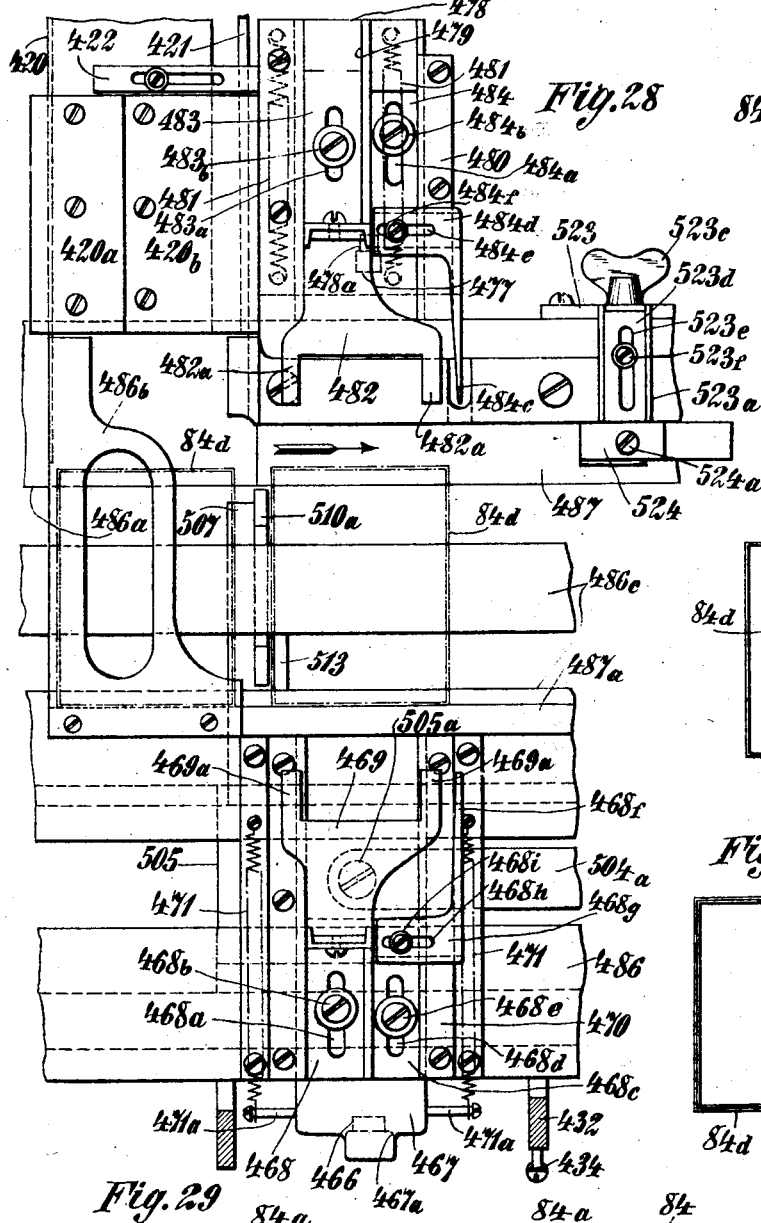

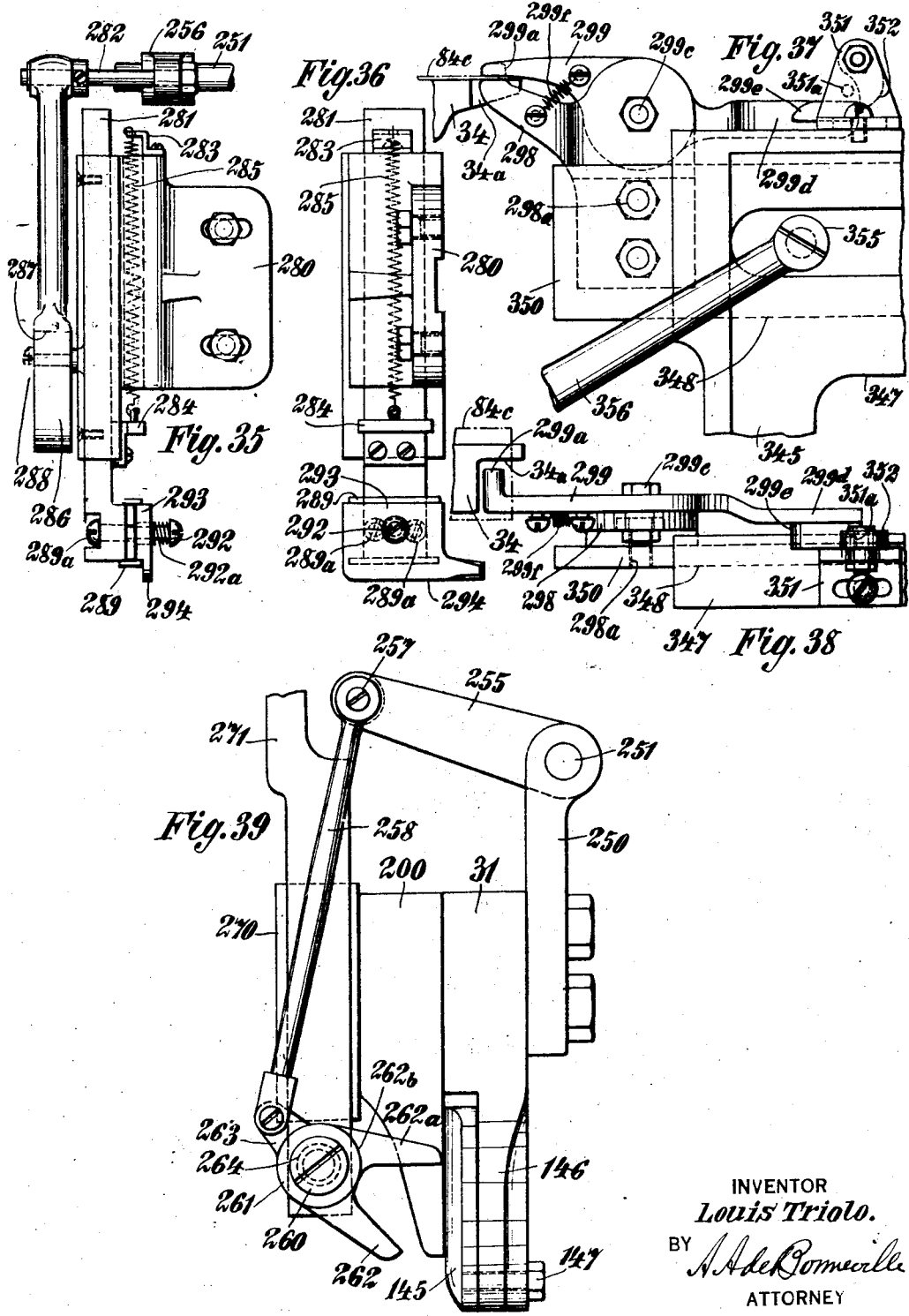

Patented May 10, 1927.

1,627,874

UNITED STATES PATENT OFFICE.

LOUIS TRIOLO, OF BROOKLYN, NEW YORK.

BOX-MAKING MACHINE AND THE METHOD OF MAKING BOXES.

Application filed April 4, 1925. Serial No. 20,702.

This invention relates to a box making machine and the method of making boxes.

The object of the invention comprises a machine, in which portions thereof are adjustable to produce boxes of different sizes. The second object of the invention is the production of a machine for making card board boxes automatically. The third object of the invention is the production of a machine which is easily operated and easily repaired.

The organization of the invention comprises means of cutting card board into strips of the proper width and securing thereto paper strips properly shaped for the neck of a box. Means are provided to bend the card board strip with its paper strip into the requisite rectangular form to locate it within the flanges or rim of a card board body of the box, and means are provided to properly secure the said neck in place in the said body of the box.

Figure 2A:
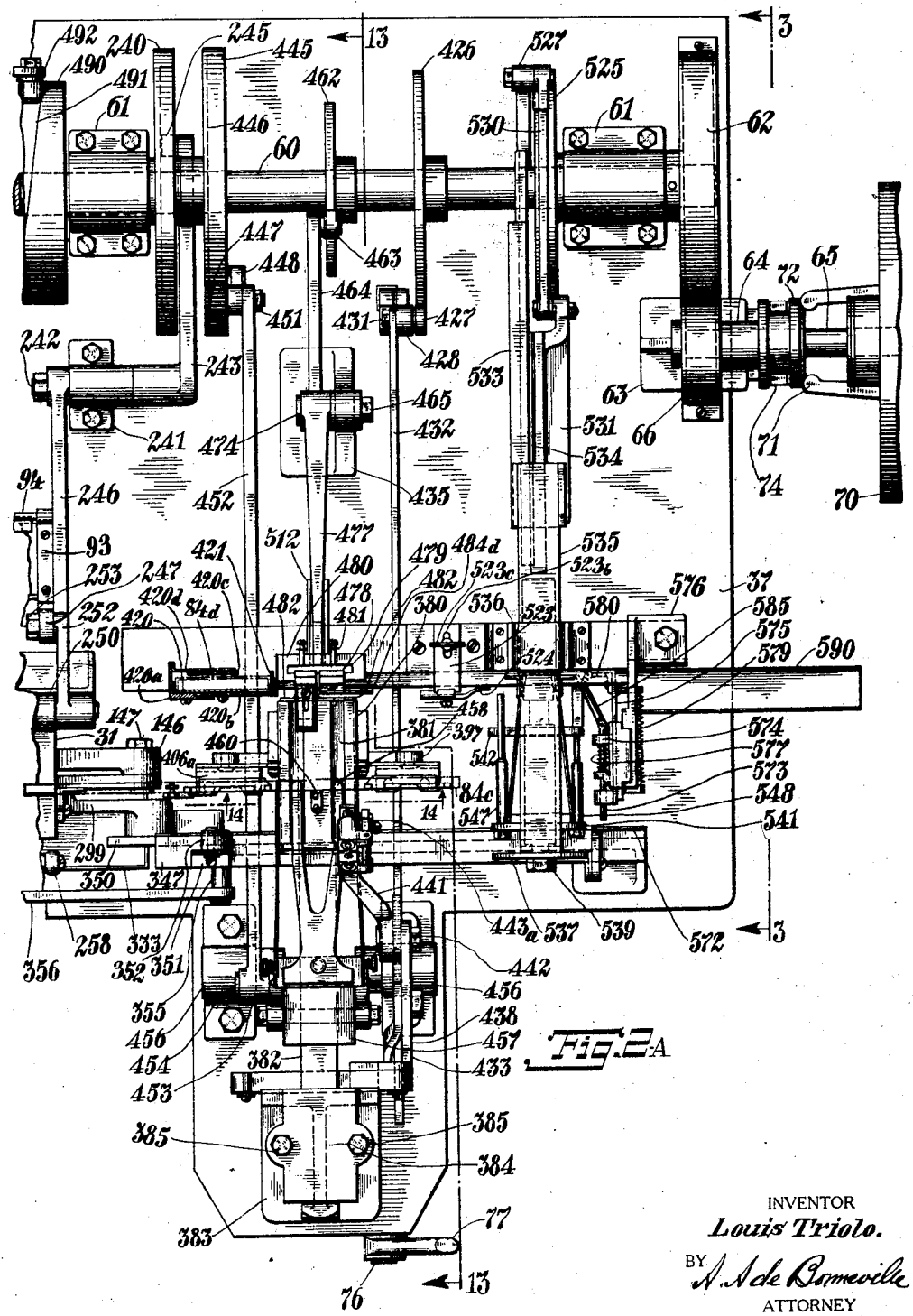
Figure 22:
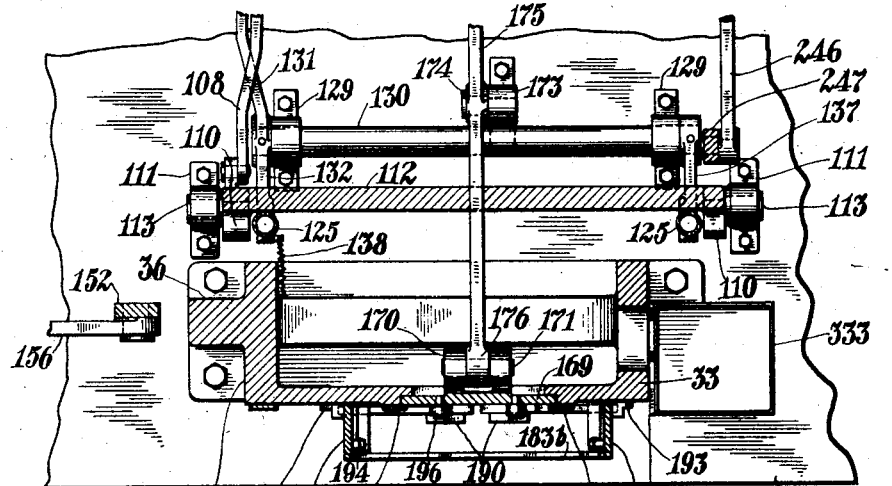
Figures 23, 24:
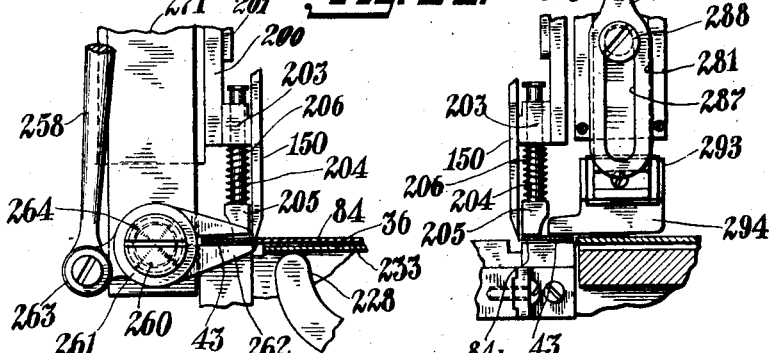
Figure 25:
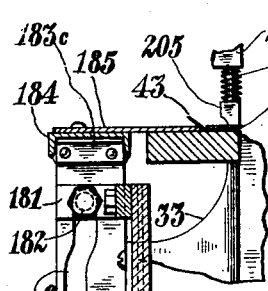
Figure 26:
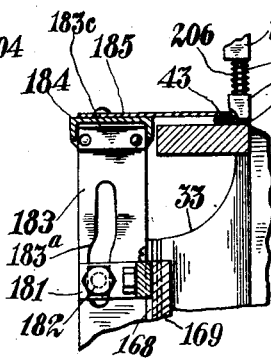
Figure 27:
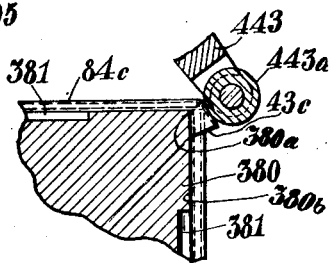

Figs. 1 and 1$^A$ represent a front elevation of the box making machine with a portion of the left hand end of Fig. 1 broken away; Fig. 1$^B$ shows the broken away portion of Fig. 1; Fig. 1$^C$ is a section of Fig. 1 on the line 1$^c$, 1$^c$; Figs. 2 and 2$^A$ show a top plan view of the machine; Fig. 3 indicates a right hand side view of Fig. 2$^A$; Fig. 4 shows an enlarged fragmentary portion of Fig. 1; Fig. 5 represents a section of Fig. 4 on the line 5, 5; Fig. 6 indicates a section of Fig. 4 on the line 6, 6; Fig. 7 shows an enlarged rear view of a fragmentary portion of Fig. 1; Fig. 8 is a section of Fig. 7 on the line 8, 8; Fig. 9 shows a fragmentary portion of Fig. 7 with some of the movable elements in different positions; Fig. 10 represents a section of Fig. 1 on the line 10, 10; Fig. 11 represents an enlarged elevation of some details; Fig. 12 shows a top plan view of Fig. 11 partly in horizontal section; Fig. 13 indicates a section of Fig. 2$^A$ on the broken line 13, 13; Fig. 13$^A$ indicates an enlarged section of Fig. 13 on the line 13$^A$, 13$^A$; Fig. 13$^B$ shows a top plan view of Fig. 13$^A$; Fig. 13$^C$ is a section of Fig. 13$^A$ on the line 13$^C$, 13$^C$; Fig. 14 shows an enlarged section of Fig. 2$^A$ on the line 14, 14; Fig. 14$^A$ is a section of Fig. 14 on the line 14$^A$, 14$^A$; Fig. 14$^B$ represents a section of Fig. 14 on the line 14$^B$, 14$^B$; Fig. 15 shows a section of Fig. 14 on the line 15, 15; Fig. 16 represents an enlarged fragmentary portion of Fig. 13; Fig. 16$^A$ is a section of Fig. 16 on the line 16$^A$, 16$^A$; Fig. 17 shows a right hand side view of Fig. 16; Fig. 18 indicates a section of Fig. 17 on the line 18, 18; Fig. 19 represents an enlarged section of Fig. 1$^A$ on the line 19, 19; Fig. 20 shows a section of Fig. 19 on the line 20, 20; Fig. 21 indicates an enlarged fragmentary portion of Fig. 2$^A$; Fig. 22 shows a section of Fig. 10 on the line 22, 22; Fig. 23 represents an enlarged right hand side view of a fragmentary portion of Fig. 1 viewed in the direction of the arrow 23 of the said figure; Fig. 24 is an enlarged left hand side view of a fragmentary portion of Fig. 1 viewed in the direction of the arrow 24 of the said figure; Fig. 25 shows an enlarged fragmentary portion of Fig. 10; Fig. 26 is a view similar to Fig. 25 with some of its elements in a different position; Fig. 27 indicates an enlarged section of Fig. 13 on the line 27, 27 with an element added; Fig. 28 represents an enlarged section of Fig. 13 on the line 28, 28; Fig. 29 represents a plan view of a fragmentary portion of the card board from which strips are cut to make the neck of the box; Fig. 29$^a$ shows a pan view of a card board strip; Fig. 30 shows a fragmentary strip of the paper and the card board neck; Fig. 31 shows a plan view of the neck of the box before being bent into proper form; Fig. 32 indicates an inside plan view of the body of the box; Fig. 33 indicates an inside plan view of the finished box; Fig. 34 shows a section of Fig. 33 on the line 34, 34; Fig. 34$^A$ shows an enlarged fragmentary plan view of one corner of the neck of the box; Fig. 35 represents an enlarged fragmentary portion of Fig. 1; Fig. 36 shows a right hand side view of Fig. 35; Fig. 37 indicates an enlarged fragmentary portion of Fig. 1$^A$; Fig. 38 shows a top plan view of Fig. 37 and Fig. 39 represents an enlarged right hand end view of a fragmentary portion of Fig. 1$^A$ viewed in the direction of the arrow 23.

Referring to Figs. 29 to 34, the card board blank is indicated at 84 with the longitudinal creases 84$^a$. The blank 84 is cut into card board strips 84$^b$. The paper web 43 and the card board strips 84$^b$ are shown in position in Fig. 30, the paper web 43 being below the card board strip 84$^b$. The machine next inserts the cuts 43$^a$ partially across the width of the paper web 43 from its outer edge and the cut 43$^b$ all the way across said paper web on a line with the adjacent end of the card board strip 84ᵇ, which forms the flap 43ᶜ for said web. Next the machine bends the paper web 43 over the card board strips 84ᵇ to form the neck 84ᶜ as shown in Fig. 31. The machine then pulls the neck in the direction of the arrow shown in Fig. 31.

The neck 84ᶜ is now bent into a rectangle, being bent on the creases 84ᵃ, and is inserted into the body portion 84ᵈ of the box, as shown in Figs. 33 and 34 which latter represents the finished box.

Referring particularly to Figs. 1, 1ᴬ, 2, 2ᴬ, and 7 to 12, 37 and 38, the box machine is shown with a frame indicated in its entirety by the letter A, and comprises the main vertical members 31, 32 and the secondary vertical members 33. The latter are connected to the members 31 and 32 by the supporting member 34, which latter has one end cut away to form the clearance space 34ᵃ. A supporting bar 35 connects the members 31 and 32.

A platform 37 with the legs 38 supports the frame of the machine. A leg 40 extends from the platform 37 and has journaled in its lower end the reel 41 for the roll 42 of the paper strip 43. A heated glue pot 46 has journaled thereto the roller 47 which extends therein. A guide roller 48 for the paper strip 43 is journaled to said pot. A pulley 49 is journaled in an extension 49ᵃ at the left hand side of the platform 37. A belt 49ᵇ connects the pulley 49ᶜ on the shaft 160 to be described. A pulley 51 turns with the pulley 49.

An adjustable tensioning device (see Fig. 1) comprises a pair of plates 50, 52 that extend from the frame A. A screw 53 engages a threaded opening in each of said plates. A screw pin 54 with a groove 54ᵃ is in threaded engagement with the frame A and has pivoted thereon the supporting plate 55 with the depending lugs 55ᵃ which engage the groove 54ᵃ. A presser arm 56 is pivoted above the plate 55 and its free end normally bears on the paper strip 43, which latter is supported on the said plate. By means of the screws 53 the plate 55 is clamped in position and by means of the screw pin 54. The plate 55 can be located at different distances from the frame to be adapted for different widths of strips of paper to be described.

The main shaft 60 (see Figs. 1ᴬ, 2, 2ᴬ, 3 and 10) of the machine is journaled in the journal bearings 61 that are supported on the platform 37, and has fastened to one end thereof the spur gear 62. Journal brackets 63 and 64 extend up from the platform 37 and have journaled therein the driving shaft 65. A pinion 66 is fastened to the shaft 65 and meshes with the spur gear 62. A pulley 70 is loosely supported on the shaft 65 and has extending therefrom the clutch members 71, that coact with the grooved pulley 72, that is splined to the shaft 65. A lever 74 is pivoted, by means of the pin 75 to the journal bracket 64. A shaft 76 is journaled in the frame A of the machine and has fastened thereto the operating handle 77 and the arm 78. A link 79 connects the arm 78 and the lever 74.

The posts 82 (see Figs. 2, 8 and 10) extend up from the platform 37 and carry the supporting plate 83 for the card board 84, having the longitudinal grooves 84ᵃ, which is to be cut into strips for the necks of the box which is made by the machine. A U shaped bracket 85 extends from the frame A and has fastened thereto the plate 86 having the guide opening 87. A bracket 89 is slidably supported on the plate 86 and has formed therewith the adjusting member 90. A bolt 91 extends through the opening 87, and its head 91ᵃ bears up against the bottom face of plate 86. A wing nut 92 for the bolt 91 enables the bracket 89 to be clamped in different positions on the plate 86. A bracket 93 is fastened to the plate 86, and a rod 94 has one end rotatively supported in said bracket while its other end is slidably supported in the adjusting member 90. A wing 95 extends from the rod 94 with its free end bearing on the card board 84. An eyelet 96 extends from the rod 94 and a spring 97 has one end fastened to said eyelet and its other end is fastened to the bracket 93. The adjusting member 90 with its appurtenances constitutes an adjusting device for card boards 84 of different widths, one edge of said cardboard being located to bear against said adjusting member 90. A cam 102 (see Figs. 2 and 10) is fastened to the main shaft 60. A bracket 103 is supported on the platform 37 and has pivoted thereto the lever 104, by means of the pivot 105. A roller 106 is journaled to the lever 104 and bears against the cam 102. A spring 107 extends between the lever 104 and the platform 37. A link 108 has one end pinned to the lever 104 by means of the pin 109.

A U shaped lever (see Figs. 2, 10 and 22) with the arms 110 and the connecting brace 112 is pivoted to brackets 111, that are supported on the platform 37, by means of the pins 113. The link 108 has one end pinned to the connecting brace 112, by means of the pin 114. A U shaped clamping bar 118 extends from the top ends of the arms 110. A wing 120 is pivoted near the top ends of the arms 110 by means of the pivot rod 121. A pair of pusher rods 123 are indicated with the spherical heads 124 that are hinged to the wing 120. A pair of tubular sleeves 125 are connected to the arm 132 and to the arm 137 to be described. Springs 126 are located in the sleeves 125 and bear up against the pusher rods 123, by means of which an automatic adjustment is attained for different thicknesses of the cardboard 84. A cam 128 is fastened to the shaft 60. Brackets 129 (see Figs. 10 and 22) extend up from the platform 37 and support the shaft 130. A lever 131 with the arm 132 is fastened to the shaft 130. The arm 132 supports one of the tubular sleeves 125, and to the end of the lever distant from the arm 132 is pivoted the roller 136 that bears against the cam 128. To the shaft 130 is also fastened the arm 137 which supports the other tubular sleeve 125. A spring 138 extends between the arm 132 and the frame A.

By means of the rotations of the cam 102 and its coacting elements the arms 110 are oscillated at the proper times to advance the cardboard 84 the requisite amount. At the proper time the cam 128 and the pusher rods 123 with their coacting parts swing the wing 120 to clamp the cardboard 84 between it and the clamping bar 118. The coaction of the clamping bar 118 and the wing 120 with their coacting elements constitute a feeding device for the cardboard 84.

Referring to Figs. 1, 2, 7, 8 and 9, a knife blade holder 145 is hinged to the lug 146 extending from the member 31 of the frame A, by means of the pin 147. A knife blade 150 (preferably of steel) is fastened to the holder 145 by means of the bolts 151. The swinging end of the knife blade holder 145 has pinned thereto one end of the link comprising the members 152 and 152$^a$. A slot 152$^b$ is formed in the member 152 and bolts 154 extend through said slot and engage the member 152$^a$, thereby the members 152 and 152$^a$ are adjustably connected to each other. A pin 153 connects the blade holder 145 and the said member 152$^a$.

A journal bracket 155 is supported on the platform 37 and has pivoted thereto one end of the arm 156, by means of the pin 157. To the arm 156 is journaled a roller 158, and the free end of said arm is pinned to the lower end of the link 152 by means of the pin 159. A shaft 160 (see Figs. 1 and 2) is journaled in a pair of journal brackets 161 supported on the platform 37. A bevel gear 164 is fastened to the shaft 60, and meshes with the bevel gear 165 fastened to the shaft 160, whereby said shaft 160 is turned. A cam 166 with the cam groove 166$^a$ is fastened to the shaft 160, and the roller 158 engages said groove. By means of the coaction of the roller 158 and the cam groove 166$^a$ and their coacting elements the knife holder 145 with the knife 150 is oscillated and cuts the cardboard 84 into strips 84$^b$ of the requisite width to form the necks of the box made by the machine.

A pair of guide plates 168, (see Figs. 1, 2, 10 and 22) extend from the vertical member 33 of the frame A of the machine and guide the slide plate 169, which latter has extending therefrom the bifurcated lug 170 for the pin 171. A journal bracket 173 is supported on the platform 37 and in turn supports the pin 174. On the pin 174 is pivoted the lever 175 having the forked end 176 which latter engages the pin 171. A roller 178 is journaled to the other end of the lever 175. A cam 180 having the cam groove 180$^a$ is fastened to the shaft 60 and said cam groove engages the roller 178.

A bracket 181 (see Figs. 1 and 10) extends from the slide plate 169 and has journaled thereto the rollers 182.

A floating frame (see Figs. 1, 8, 10, 25 and 26) is indicated with the side members 183 having the cam openings 183$^a$, and the elongated openings 183$^d$. A cross bar 183$^b$ connects the members 183. At the upper ends of the members 183 is fastened an angle iron 183$^c$, which latter supports the channel iron 184. A bending plate 185 is supported upon and fastened to the channel iron 184. The rollers 182 engage the cam openings 183$^a$ of the side members 183.

A pair of bell crank cams (see Figs. 1 and 10) having the arms 190 and 191 are pivoted to the lugs 186. Cam faces 192 are formed at the upper ends of the arms 190. A pair of rollers 196 are journaled to the slide plate 169 and coact with the cam faces 192. Stops 193 extend from the member 33 of the frame A for the ends of the arms 191. Springs 194 have each one end fastened to one of the members 183 and the other ends of said springs are fastened to the angle irons 195 extending from the member 33 of the frame A. Pins 195$^a$ extend from the angle irons 195 and engage the openings 183$^d$ of the members 183. The bending plate 185 during its movement by the coaction of the rollers 182 and the cam openings 183$^a$ in the members 183 is elevated, then horizontally moved toward the knife blade 150, and then is lowered and bears on the paper strip 43$^a$, to fold it over the edge of the cardboard strip 84$^b$ and fastens it thereto by means of an adhesive which has been spread on its upper surface by the roller 47. The members 183 are maintained in their raised position for a short interval of time by the coaction of the rollers 196 and the cam surfaces 192.

To the members 31 and 32 is connected the slide supporting plate 200 (see Figs. 1, 7, 8 and 9) which has extending therefrom the guide bars 201 for the slide plate 202. A bar 203 is fastened to the plate 202. Pins 204 extend through openings in the slide bar 203 and have connected to their lower ends the presser bar 205. Springs 206 encircle the pins 204 and bear between the said presser bar 205 and the bar 203. An angle stop plate 210 is fastened to the plate 200. Lugs 207 are fastened to the supporting plate 200. Springs 208 are located in openings 209 formed in the slide plate 202 and bear between the lugs 207 and the roof of said opening 209.

On the slide plate 202 (see Figs. 7, 8 and 9) is fastened the block 212. A bell crank shaped cam with the arms 213 and 214 is pivoted to the plate 200 by means of the pivot pin 215. A cam 216 is formed on the arm 214. The end of the arm 213 always bears upon the block 212. An arm 219 is fastened to the knife blade holder 145 by means of the screws 220, and has formed therewith the cam 221. While the knife blade holder 145 with its knife 150 is located in its lowered position (see Fig. 9), the cam 221 of the arm 219 is located below the cam surface 216 of the arm 214, and when the cam surface 221 rides on the lower face of the cam 216, the presser bar 205 bears on the cardboard strip 84$^b$ and holds it in place while the bending plate 185 bends the paper strip 43 in place to the cardboard strip 84$^b$.

When the cam 166 lowers the blade holder 145, the presser bar 205 lowers by virtue of the cam 221 bearing on the top face of the cam 216 and which causes the arms 213 and 214 to swing, the arm 213 bearing on the block 212. The cams 216 and 221 hold the cardboard strip 84$^b$ in place while the cam 166 is not directing the roller 158 to receive sufficient time to glue the paper web 43 to the cardboard strip 84$^b$, (see Figs. 25 and 26) and allow the fingers 298 and 299, to be described, to grip the paper web. At this instant the knife 150 and the presser bar 205 are released from the paper web and it is now drawn to the neck bending appurtenances of the machine.

A supplemental cam 225 (see Figs. 1, 2, 7, 8, 10 and 22) is fastened to the cam 180. A journal bracket 226 is supported on the platform 37. A lever having the arm 227 with the nose 228 and the arm 229 is pivoted to the bracket 226 by means of the pin 230. A roller 231 is journaled to the arm 229 and engages the supplemental cam 225. A wing 233 is hinged to the frame of the machine by means of the pivot 234. The nose 228 extends through an opening 235 of the bar 35 of the frame of the machine and swings up the wing 233 at the proper time, to raise the cardboard 84$^b$ after it has been severed and when it starts to again move forwardly.

A groove cam 240 (see Figs. 2 and 2$^A$) is fastened to the shaft 60. A journal bracket 241 is supported on the platform 37. A journal pin 242 is supported in the journal bracket 241 and has fastened to one end thereof the arm 243. The latter has journaled to the swinging end thereof the roller 245, which engages the groove of the groove cam 240. An arm 246 is fastened to the other end of the pin 242. A link 247 has one end pinned to the arm 246. Brackets 250 (see Figs. 1, 2, 7, 8 and 23) are fastened to the members 31 and 32 of the frame of the machine and have journaled therein the cross shaft 251. An arm 252 extends from the cross shaft 251 and its free end is pinned to the link 247 by means of the pin 253. Similar arms 255, and 256 extend from the shaft 251. In the end of the arm 255 is supported a pin 257 which latter supports one end of the link 258. The link 258 can be operatively located in different positions on the pin 257. A pin 260 (see Figs. 1, 2, 3 and 39) extends from the slide bar 271 and supports the hub 261 of the cutting blade 262 of a pair of shears. The other blade 262$^a$ of the shears has its hub 262$^b$ fastened to the pin 260. A lug 263 extends from the hub 261. A spring 264 encircles the pin 260 and bears between the head of said pin and the hub 261 to maintain the blade 262 in proper lateral position. The lug 263 at the proper time swings with the lower end of the link 258, whereby the cutting blades 262 and 262$^a$ cut the paper web 43 with the cut 43$^b$ and at the same time the cut 43$^a$ is made in said web 43.

On the plate 200 is adjustably secured the guide bracket 270 (see Fig. 1) which can be adjusted on the spline 271$^a$. A slide 271 is guided in the bracket 270. An angle iron 272 is fastened to the member 31 of the frame. A similar angle iron 273 is fastened to the slide 271. A spring 274 has its ends fastened to said angle irons to assist in raising the cutting blades 262 and 262$^a$.

A second guide bracket 280 (see Figs. 1, 35 and 36) similar to 270, is adjustably connected to the plate 200, and can be moved on the spline 280$^a$ extending from said plate. A slide bar 281 similar to 271 is guided in the bracket 280. An angle iron 283 is fastened to the bracket 280. An angle iron 284 is fastened to the slide bar 281. A spring 285 has one end fastened to the angle iron 283 and its other end to the angle iron 284.

A link 286 (see Figs. 1, 24, 35 and 36) has its upper end supported on the pin 282 extending from the arm 256, and in its lower end is formed the elongated slot 287. A pin 288 extends from the slide bar 281 and engages the slot 287. The upper end of the link 286 can be operated to coact in different positions on the pin 282. A T shaped block 289 is fastened to the lower end of the slide bar 281 by means of the screws 289$^a$. A screw 292 extends from the slide bar 281 and passes through an opening in the knife blade 293, having the cutting edge 294. The said blade is supported between the upper and lower flanges of the block 289. A spring 292$^a$ encircles the screw 292 and bears between the head of said screw and the adjoining face of the knife blade 293. The knife blade 293 coacts with a stationary knife blade 295 extending from the frame of the machine, and inserts a cut in the web 43 before the latter is bent over the edge of the card board neck and simultaneously with the cut made by the blades 262 and 262$^a$. A clamping finger 298 (see Figs. 1, 1$^A$, 13, 14, 15, 36 and 38) is fastened to the slide bar 350 to be described, by means of the screws 298$^a$. A clamping finger 299 is pivoted to the finger 298 by means of the pivot 299$^c$. The finger 299 has formed therewith an extension 299$^a$ and a second extension 299$^d$ with the nose 299$^e$. The fingers 298 and 299 draw the paper strip 43 with its neck 84$^c$ of cardboard across the strip supporting member 34 of the frame of the machine. The space 34$^a$ of the supporting member of the frame of the machine provides clearance space for the operation of the fingers 298 and 299.

A bracket 300 (see Figs. 2, 11 and 12) extends from the platform 37 and has hinged thereto the lever 301, by means of the pin 302. The lever 301 has pivoted thereto the rollers 303 and 304. A cam 307 is fastened to the shaft 160 and coacts with the roller 303 to swing the lever 301. A journal bearing 308 extends from the member 36 of the frame A. An arm 309 is indicated with the sleeve 310 extending therefrom and which is supported in the journal bearing 308. A lever 311 has one end fastened to the sleeve 310 and from its other end extends the pin 313, on which is journaled the glue wheel 312. The arm 309 coacts with the roller 304 of the lever 301. A spring 315 has one end fastened to the platform 37 and its other end is fastened to the arm 309. A pulley 318 is fastened to the shaft 160 and a pulley 319 is fastened to the shaft 320 extending through the sleeve 310. An idler pulley 322 is journaled on the pin 323 extending from a bracket 324 which in turn extends from the bracket 325 loosely supported on the shaft 160. A belt 326 connects the pulleys 318 and 319 and is tensioned by the idler 322. A sprocket chain wheel 330 is fastened to the shaft 320. A second sprocket chain wheel 331 is journaled on the pin 313 and fastened to the glue wheel 312. A bracket 314 with the guide lug 314$^a$ extends from the lever 311. A sprocket chain 332 connects said sprocket chain wheels. A glue pot 333 is supported on the leg 334 (see Figs. 1 and 1$^A$) which extends up from the platform 37. A bar 335 extends from the glue pot 333 and is fastened to the member 33 by means of the screw 335$^a$. During the rotation of the shaft 160 the lever 311 swings the glue wheel 312 and said glue wheel is at the same time continuously rotated. When the glue wheel 312 is in its raised position (see Fig. 11) it spreads glue on the lower face of the cardboard neck 84$^c$. A frame with the vertical members (see Figs. 1, 1$^A$, 3, 13, 37 and 38) 345, 346 and the horizontal connecting portion 347 is fastened to the platform 37. A guide opening 348 is formed in the connecting portion 347. A slide bar 350 is guided in the guide opening 348 and has fastened thereto the stationary finger 298 by means of the bolts 298$^a$ and the swinging finger 299 is pivoted to the finger 298 by means of the pivot bolt 299$^c$. A spring 299$^f$ has one end fastened to the clamping finger 298 and its other end is fastened to the clamping finger 299. A bracket 351 with the pin 351$^a$ extends from the portion 347 and has pivoted thereto the cam piece 352. A bracket 353 extends from the portion 347 and has journaled thereto the roller 354. A pin 355 extends from the slide 350 and has supported thereon one end of the connecting rod 356.

A bracket with the legs 360 (see Figs. 1, 2, 4, 5 and 6) extends up from the platform 37 and supports the stationary cam disc 361, having the cam groove 362 formed therewith. A disc 365 adjacent to the disc 361 is indicated with the hub 366, and the latter is fastened to the shaft 160. On the outer face of the disc 365 is formed a slide groove 367. A pair of guide plates 368 are fastened to the disc 365 and project somewhat over the edges of the groove 367. A slide 370 is guided in the groove 367 and has extending therefrom a screw pivot 371, for one end of the connecting rod 356. An elongated opening 373 is formed in the slide 370. A roller 375 engages the cam groove 362 and has extending therefrom the stud 374, which latter extends through the opening 373, and by means of the nut 376, the roller 375 can be located in different positions in the slide 370. The stroke of the slide 370 can be varied by the coaction of the pin 374 and the opening 373 and thereby adjust the stroke of the fingers 298 and 299. When the slide 350 moves to the right from the position indicated in Fig. 37, the fingers 298 and 299 clamp the adjacent end of the neck 84$^c$ and draw said neck to its proper position, under the stationary forming block 380. When the neck reaches the latter position, the nose 299$^e$ contacts with the roller 354 and swings up the finger 299 to release the said neck. When the slide bar 350 moves toward the roller 354 the spring 299$^f$ holds the finger 299 clamped to the neck. When the slide bar moves in the opposite direction from that stated just above, the finger 299$^a$ remains in its closed position until the nose 299$^e$ meets the arm 352, which coacts with the stop pin 351$^a$ extending from the bracket 351, and lowers the nose 299$^e$ and swings up the finger 299, and permits it and the finger 299 to be positioned about the end of the neck 84$^c$. When the slide bar moves to the right from the position indicated in Fig. 37, the cam piece 352 swings out of the way of the nose 299$^e$ and the neck 84$^c$ remains clamped to the fingers 298 and 299 until the nose 299$^e$ strikes the roller 354.

A stationary forming block 380 with the concaved walls 380ᶜ (see Figs. 2ᴬ, 13, 14, 15 and 27) with the grooves 381 is supported on the holder 382 fastened to the bracket 383 by means of the cap 384 held in place by the bolts 385. The bracket 383 extends up from the platform 37 and is bolted thereto. The card board neck is drawn across the bar 402 to be described, by means of the fingers 298 and 299.

A cam 386 (see Figs. 1, 1ᴬ, 2, 11, 14, 14ᵃ, 14ᵇ and 15) with the cam grooves 287 engages the roller 388 pivoted on the lower arm 389, and rocks the shaft 390 supported in the journal bracket 391 extending from and below the platform 37. To the shaft 390 is fastened one end of the arm 392. A pivot 393 extends from the arm 392 and engages the slide plate 394 which is guided in the slide grooves 395. The plate 394 is maintained in proper position by strips 396, fastened to the bracket 401 to be described. From the upper end of the slide plate 394 extends the projection 394ᵃ. The slide plate 394 has formed therewith the lugs 397, to which are fastened the pivots 398 which engage the slots 399 in the bending members 400. The bracket 401 extends from the platform 37. Small projections 381ᵃ extend up in the grooves 381 and guide the slide 401ᵃ.

A bar 402 is fastened to the upper end of the slide 401ᵃ and the members 400 are hinged to the bar 402 by means of the pivot screws 403. An opening 401ᵇ is formed in the slide 401ᵃ and contains a helical compression spring 401ᶜ. The bottom end of the spring 401ᶜ is fastened to the bottom of the opening 401ᵇ and the top end of the spring is fastened to a pin 401ᵈ extending from the bracket 401. An angle bracket 401ᵉ extends from the slide 401ᵃ and engages a projection 394ᵃ extending from the slide 394. A presser bar 404 is attached to the rods 405, which latter are movably supported in the cavities 406 of the blocks 406ᵃ. Brackets 406ᵇ have one leg of each fastened to the blocks 406ᵃ, and the other ends of the brackets 406ᵇ extend into a cavity of each of the rods 405. The said cavities have each a slide slot 405ᵃ. A spring 406ᶜ bears between the roof of each cavity in the rods 405 and the members of the bracket 406ᵇ that extend into said cavity. An arm is indicated at 411, and has pivoted to its free end the roller 412. A finger 413 is fastened to the free end of said arm. The said arm 411 is pivoted to the block 406ᵃ by means of the screw pivot 414. A spring 415 has one end fastened to the block 406ᵃ and its other end is fastened to the arm 411. When the neck 84ᶜ is drawn beyond the bar 402, by means of the fingers 298 and 299, the glue wheel 312 rises and bears against the bottom face of the said neck and coats the same with the glue or adhesive provided by the glue pot 333. When the nose 299ᵉ of the finger 299 strikes the roller 354, the finger 299 opens to release the neck 84ᶜ. Immediately thereafter the slide plate 394 is raised by the arm 392 through the coaction of the roller 388 of the arm 392 with the cam groove 387 of the cam 386. At the same time the bending members 400 by the coaction of the pivots 398 and slots locate the neck 84ᶜ against the sides of the forming block 380. As the slide plate 394 rises, the tension of the spring 401ᶜ raises the slide 401ᵃ and thereby a portion of the neck 84ᶜ is brought against the bottom face of the forming block 380. By the roller 412 and the finger 413 the left hand portion of the neck 84ᶜ is brought to the top face of said forming block.

To a frame 486 to be described, is supported a chute. The chute (see Figs. 1, 1ᴬ, 2ᴬ and 28) comprises the angle plate 420 which is fastened to the frame 486. To the plate 420 is fastened the angle plate 420ᵃ. An angle plate 420ᵇ is fastened to the plate 420. A slide plate 421 is fastened to the angle plate 420ᵇ. A rear plate 420ᶜ is spaced from the plate 420 and is supported on the angle strips 420ᵈ which latter are in turn fastened to the angle plate 420ᵃ. The chute in the operation of the machine is charged with the body portions to be described.

A cam 426 (see Figs. 2ᴬ, 13 and 27) is fastened to the shaft 60, engages the roller 427 journaled to the lever 428. The lever 428 has one end fastened to the pivot 429 which latter is supported in the bracket 430 extending from the bottom face of the platform 37. A pivot 431 at the upper end of the lever 428 connects the latter with the bar 432. The other end of the bar 432 is supported in the guide bracket 433 extending from the holder 383. A spring 434 has one end fastened to the bar 432 and its other end is fastened to the bracket 435 supported upon the platform 37. To one end of the bar 432 is pivoted one end of the arm 436. A pivot 437 connects the arm 436 with the bracket 438 extending from the holder 383. A gear sector 439 is formed at the upper end of the arm 436. The sector 439 meshes with the gear sector 440 of the lever 441, and which is pivoted to the bracket 438, by means of the pivot 442. The lever 441 is indicated with the thickened end 441ᵃ, which has formed therein a pair of guide openings 441ᵇ and has also formed therewith a pair of journal lugs 441ᶜ. A pair of plungers 441ᵈ are guided in the openings 441ᵇ. A T shaped cross bar with the bottom flange 441ᵉ is pivoted to the bottom ends of the plungers 441ᵈ. A plate 441ᶠ is fastened to the top face of the thickened end 441ᵃ and has extending therefrom a pair of pins 441ᵍ, which latter extend into the axial openings 441ʰ in said plungers 441ᵈ. A spring 441ⁱ bears between the bottom end of each pin 441ᵍ and the bottom end of the opening 441ʰ. A bracket 443 is hinged to the journal lugs 441ᶜ and has journaled to its lower end the roller 443ª. A pin 444 has one end in threaded engagement with the thickened portion 441ª and extends through an opening 443ᵇ in the bracket 443. A spring 444ª encircles the pin 444 and bears between the head of said pin 444 and the bottom of the enlarged opening 443ᶜ of the bracket 443. When the roller 443ª lowers with the lever 441 it is brought into contact with the ends of the lip 43ᶜ of the web 43, on the right hand top corner 380ª of the forming block 380 (see Fig. 27), by means of which the portion of the flap 43ᶜ extending beyond the end of the cardboard strip 84ᵇ is brought to bear against the member of the neck 84ᶜ bearing against the face 380ᵇ of the forming block 380. At the same time the cross bar with the bottom flange 441ᵉ bears on the upper member of the neck 84ᶜ at the corner 380ª of the forming block 380.

A cam 445 (see Figs. 1ᴬ, 2ᴬ, 3, 13 and 15) with the groove 446 is fastened to the shaft 60. A lever 448 is pivoted on a pin 449 extending from the bracket 450, which latter in turn extends from the platform 37. A roller 447 journaled to the lever 448, engages the groove 446 of the cam 445. A pin 451 extends from the lever 448, and a bar 452 has one end supported on the pin 451. The other end of the bar 452 is connected to the lever 453 by means of the pin 454. The lever 453 has one end fastened to the pin 455 supported in the bracket 456 extending from the platform 37. To the upper end of the lever 453 is pinned the slide block 457 which in turn is supported on the holder 382. Flat springs 458 have each one end fastened to the slide block 457 and to their other ends are fastened little guide blocks 458ª that engage the grooves 381 of the forming block 380. To the sides of the forming block 380 are fastened the small brackets 459.

After the neck 84ᶜ is bent over the forming block 380 and its ends fastened to each other, the springs 458 move toward said neck 84ᶜ by the coaction of the cam 445 and the levers 452 and 453. The guide blocks 458ª first engage the projections 381ª in the grooves 381 and spreads the outer ends of the springs 458 so that their ends clear the neck 84ᶜ and when the guide blocks 458ª leave the projections 381ª, they bear against the neck 84ᶜ, and move it on the forming block 380 into the body portion 84ᵈ of the box. While the members of the neck 84ᶜ bear against the concaved sides 380ᶜ, the neck is reduced in size.

A cam 462 (see Figs. 1ᴬ, 2ᴬ, 13 and 28) is fastened to the shaft 60. A rocker arm with the members 464, 466 and 472 with the bifurcated end 473 is pivoted on the pin 465 extending from the bracket 435. A roller 463 is journaled in the free end of the member 464 and engages the cam surface of the cam 462. The member 466 bears down on the nose 467ª of the slide bar 467. The slide bar 467 has adjustably connected thereto the plate 468. The latter has the elongated opening 468ª and a screw 468ᵇ extends through the opening 468ª and engages the slide bar 467. A finger bar 469 with the fingers 469ª is connected to the plate 468. The slide bar 467 is guided in guides 470 extending from the frame 486 having the legs 485 that are supported upon the platform 37. Springs 471 have each one end fastened to one of the guides 470 and the other ends of the springs are fastened to pins 471ª extending from the slide bar 467.

To the slide bar 467 is adjustably fastened the plate 468ᶜ having the elongated opening 468ᵈ, by means of the screw 468ᵉ. A finger 468ᶠ with the shank 468ᵍ having the elongated opening 468ʰ is adjustably fastened to the plate 468ᶜ by means of the screw 468ⁱ.

To the upper end of the bracket 435 is pivoted, by means of the pivot 474 the bell crank having the arms 475 and 477. A rounded end 476 is provided for the arm 475 and engages the bifurcated end 473 of the arm 472. A slide 478 is guided in the groove 479 of the bracket 480 supported on the frame 486. The free end of the arm 477 bears up against the block 478ª fastened to the slide 478. A pair of springs 481 have each one end fastened to a pin 481ª extending from the slide 478 and the other ends of the springs are fastened to the bracket 480. A finger bar 482 with the fingers 482ª is fastened to the plate 483. The latter has formed therewith the elongated opening 483ª and is clamped to the slide 478 by means of the screw 483ᵇ. To the slide 478 is adjustably fastened the plate 484 having the elongated opening 484ª, by means of the screw 484ᵇ. A finger 484ᶜ is shown with the shank 484ᵈ having the elongated opening 484ᵉ. The shank 484ᵈ is adjustably clamped to the plate 484 by means of the screw 484ᶠ.

When the cam 462 actuates the arms 464 and 477, the fingers 469ª and 482 are located in proper position to hold the box when the springs 458 recede therefrom. The fingers 469ª and 482ª are stops to hold the neck 84ᶜ in the box when the springs 458 recede therefrom. The fingers 468ᶠ and 484ᶜ function as stops when the body portion of the box is moved in position for the forming block 380. A guide plate with the upper and lower guide members 486ª and the central member 486ᶜ, is fastened to the frame 486 supported upon the platform 37, and horizontal guide plates 487 and 487ª are fastened to the plate 486ª. A guide plate 486ᵇ is spaced from the plate 486ª and fastened to the guide plate 487ª.

A barrel cam 490 (see Figs. 1, 1ᴬ, 2 and 2ᴬ) with the groove 491 is fastened to the shaft 60. A roller 492 is journaled on the lever 493, which extends from a pivot 493ª supported in a bracket 493ᵇ extending from the bottom face of the platform 37. An arm 494 extends from the pivot 493ᵃ and has at its free end the pivot pin 495. A connecting rod 496 has one end connected to the arm 494 and at its other has an eye as shown at 497 which engages the pin 498. The latter extends from the arm 499 of a lever having the second arm 502. A bracket 501 extends from the bottom face of the platform 37 and supports the pin 500, which in turn supports the lever having the arms 499 and 502. A pivot pin 503 extends from the arm 502 and supports one end of the link having the adjustably connected members 504 and 504ᵃ. A slide 505 bears on the connecting frame 486 and is held in position by the guide plates 506. To the slide 505 (Figs. 13, 16, 17 and 18) is attached the member 507. A slide 510 with fingers 510ᵃ supported in the groove 511 of the member 507 and is held in proper position by the guide strips 512. A lever 513 is pivoted, by means of the pivot pins 514 to the member 507, in a plane at right angles thereto. The upper end of the lever 513 is pivoted to the slide 510 by means of the pivot pin 515. To the lower end of the lever 513 is pivoted a lever 516 by means of the pivot pin 517.

A spring 518 has one end fastened to a rod 518ᵃ extending from the lower end of the lever 513, and its other end extends through an opening in said lever and is attached to the lever 516. To the bracket 506ᵃ extending from the frame 486 is connected a cam 519. A U shaped piece 520 is integral with the member 507 and is connected to the slide 505. A spring 521 is located in an opening 522 of the slide 510. A block 507ᵃ extends from the member 507 and extends into the opening 522 and bears against one end of the spring 521.

When the barrel cam 490 turns, the connecting rod 496 is moved and swings the lever having the arms 499 and 502, and thereby the slide 505 is reciprocated. When the slide 505 moves to the right (Fig. 17) the fingers 510ᵃ of the slide 510 are moved in the direction of the arrow (Fig. 28), the partly completed box moves with the fingers 510ᵃ to locate it in proper position for the plunger 554 to be described. When the partly completed box has arrived in this position the fingers 510ᵃ are moved to clear the partly finished box by the coaction of the lever 516, which rides on the inner face 519ᵃ of the cam 519 and swings the lower end of the lever 513 (Fig. 16). When the lever 516 leaves the cam 519, the spring 521 moves the slide 510 to the position shown in Figs. 16 and 16ᴬ, which locates the fingers 510ᵃ in the path of the said partly completed box. Upon the return stroke of the slide 505 the lever 516 again coacts with the cam 519 to locate the fingers 510ᵃ out of the path of the partly completed box.

To the frame 486 is adjustably fastened an angle plate with the members 523 and 523ᵃ (Figs. 1ᴬ, 2ᴬ and 28). The member 523 has the elongated opening 523ᵇ and is fastened in place by the screw 523ᶜ. A plate 523ᵈ is shown with the elongated opening 523ᵉ and is adjustably fastened to the member 523ᵃ by means of the screw 523ᶠ. To the lower end of the plate 523ᵈ is fastened the bending arm 524 by means of the screw 524ᵃ.

When the uncompleted box moves from the forming block 380 to the plunger 554, the bending arm 524 bends the flap 43ᵉ of the strip to a plane parallel to the top edge of the uncompleted box.

A cam 525 (Figs. 2ᴬ, 3, 19, 20 and 21) is fastened to the shaft 60. A lever 527 is supported on a pivot pin 528 extending from a bracket 529. The latter is connected to the bottom face of the platform 37. A roller 526 is journaled to the lever 527 and engages the groove 525ᵃ of the cam 525. A connecting bar 530 has one end connected to the lever 527 and its other end is connected to the slide 531, which is guided in a groove 532 of a bracket 533, supported on the platform 37. Guide strips 534 on the bracket 533 maintain the slide 531 in place. To the slide 531 are connected the forwardly extending bars 535, one of which slides through the cap 536 secured to the frame 486. A plate 537 connects the forward ends of the bars 535. A bar 538 with the axial guide opening 538ᵇ is connected to the plate 537 by means of the stud 538ᵃ and the nut 539. A spring 540 bears between the plate 537 and the plate 541. The latter is slidably mounted on the bar 538. A plate 542 is also slidably mounted on the bar 538 and coacts with the plate 541, by means of the spring 543 that extends around the guide rods 544. A stop bracket 545 has one end fastened to the frame 486, and a stop rod 546 has one end fastened to the plate 541. A stop rod 547 has one end fastened to the plate 541. A rod 548 with the head 549ᵃ is slidably supported in an opening in the plate 541. The end of the rod opposite its head is fastened to the plate 542. A spring 549 bears between the head 549ᵃ and the plate 541. To the plate 541 is fastened the bearing block 550 and to the latter, one end each of the guide bars 554 is attached. Springs 551 have one end each fastened to the block 550, and their other ends are fastened to the shoes 552 and the angular members 553. A rectangular plunger 554 with the tapered surfaces 555 and the shank 556 extends between the shoes 552. The shank 556 extends into the opening 538ᵇ of the bar 538. A spring 557 is located in said opening and bears between the end wall thereof and the end of the shank 556. A pin 559 extends from the shank 556 through an elongated opening 560 in the bar 538, which limits the movement of the said bar 538. Braces 561 are fastened to the upper end of the plate 542 and braces 562 are fastened to the lower end of said plate. A plate 565 has fastened thereto the plunger rods 566. The plate 565 has connected thereto the tube 567, which is closed at one end and contains the spring 568, which bears between the head 567ª of said tube and the frame 486. A pliable disc 567ᵇ extends from the head 567ª. The plate 565 is slidably supported on the studs 569 extending from the frame 486.

When the body portion 84ᵈ of the box with its neck 84ᶜ inserted therein, is moved to be coaxial with the plunger 554, the cam 525 by its coaction with the roller 526 of the lever 527, the link 530, and the slide 531, the bars 535 are moved as is also the plate 537 and the plunger 554 presses against the upper faces of the neck 84ᶜ, to force the angular members 553 against the inner faces of the portions of the neck, to seat it securely in the body portion 84ᵈ of the box.

An angle plate 572 (see Figs. 1ᴬ, 2ᴬ, 3 and 21) is fastened to the plate 537 and can bear against the end of the slide rod 573, which is slidably supported in the bearings 574. The latter are integral with the slide bar 575. The latter is slidably supported on the bracket 575ª. The bracket 575ª is fastened to the bracket 576 and the latter is fastened to the frame 486. A spring 577 encircles the rod 573. A collar 578 is fastened to the rod 573, and the spring 577 bears between said collar and the bearing 574. A spring 579 has one end fastened to the pin 579ª, extending from the slide bar 575, and its other end is fastened to the pin 579ᵇ extending from the bracket 575ª. An angular member 580 with the clamping jaw 581 is fastened to the slide bar 575. An oscillating clamping jaw 583 is pivoted to the jaw 581 by means of the pivot 582. A lug 583ª extends from the jaw 583. A plunger rod 584 has one end pinned to the lug 583ª, and has extending therethrough the cross pin 586. A tube 585 has connected thereto the lug 585ª and is provided with the guide opening 585ᵇ. The lug 585ª is pinned to the rod 573 by means of the pin 588. The plunger rod 584 extends into the tube 585 and the cross pin 586 engages the openings 585ᵇ. A spring 587 encircles the plunger rod 584 in the tube 585 and bears between the bottom end thereof and the cross pin 586.

When the plunger 554 coacts with the shoes 552, the plate 537 with the angle plate 572 bears against the rod 573, and thereby the slide 575 moves in the direction of the arrow C (see Fig. 21) and the jaw 583 closes over the outer edge of the neck 84ᶜ of the box and locates the small flap 43ᶜ of the strip 43 on the inner face of the neck as shown in Fig. 34ª.

Immediately after the angular members 553 are released from the inside of the box, the plungers 566 push the box into the opening between the plates 487 and 487ª. In this latter position the finished box is pushed by the next succeeding finished box to the discharge chute 590 extending from the frame 486.

Having described my invention what I desire to secure by Letters Patent and claim is:

1. In a tensioning device for a paper strip the combination of a pivoted supporting plate, a presser arm pivoted over the plate with its free end adapted to bear on the strip of material supported on the plate.

2. In a tensioning device for a paper strip the combination of a frame, a pair of plates extending from the frame, a screw in threaded engagement with an opening in each plate, a supporting plate pivoted to the frame and adapted to be spaced to different positions from said frame and a presser arm pivoted above the supporting plate.

3. In an adjusting device for card board the combination of a plate to support said card board, said plate having a guide opening therethrough, a bracket bearing on the plate, an adjusting member extending from said bracket a bolt extending through said bracket and said opening to clamp said bracket in operative position, a bracket extending from said plate, a rod with one end supported in the latter bracket and its other end slidably connected to the adjusting member, a wing extending from the rod with its end bearing on the cardboard on said plate, and flexible means to maintain the free end of the wing in proper position.

4. In a machine of the character described means to cut card board strips comprising a knife blade holder with one end pinned in the machine, a knife blade connected to said holder, a link comprising a pair of adjustable members with one end pinned to the other end of the said holder, a platform for the machine, a rotatable shaft journaled above the platform, a cam having a cam groove fastened to said shaft, a journal bracket extending above said platform, a pin extending from said bracket, an arm with one end pivoted to said pin, the other end of the arm pinned to said link and a roller journaled to said arm engaging the cam groove of said cam.

5. In a machine of the character described the combintion of a frame, a slide plate in the frame, means to reciprocate the slide plate, a bracket extending from the slide plate, a roller journaled at the ends of the bracket, a floating frame comprising a pair of side members each with a cam opening, said openings engaging said rollers, a channel iron connecting the upper ends of the side members of the floating frame and means to raise the side members and a bending plate fastened to and supported upon said channel iron.

6. In a machine of the character described the combination of a frame, a slide plate guided in the frame, means to reciprocate the slide plate, rollers for the slide plate, a floating frame comprising a pair of side members each with a cam opening, said openings engaging said rollers a bending plate extending across the upper ends of the side plate, a pair of bell crank cams pivoted to the frame of the machine, one arm of each bell crank cam having a cam face, a pair of rollers journaled to the slide plate coacting with said cam faces of the bell crank cams, the other arms of the bell cranks bearing up against the lower ends of said side members and a spring each with one end fastened to said side members and their other ends fastened to the frame, the said bending plate having imparted thereto, a movement taking a direction resulting from a vertical upward and a horizontal movement, then taking a direction downward and then returning to its original position with a horizontal and downward movement.

7. In a box making machine the combination of a slide supporting plate, a slide plate supported thereon, a bar fastened to the supporting plate, pins extending through openings in said bar, a presser bar connected to the lower ends of said pins, springs encircling the pins bearing between said bar and said presser bar, lugs fastened to the supporting plate, springs located in openings of the slide plate bearing between said lugs and the roof of each opening, a block fastened to the slide plate, a bell crank shaped cam having a pair of arms pivoted to the supporting plate, a cam formed with one of said arms, a knife blade holder with one end pivoted in the machine, a knife blade for the holder, means to actuate said holder, an arm fastened to the knife blade holder, a cam formed with the latter arm, the cams located so that the bell crank shaped cam is adapted to ride around the cam of the knife blade holder and when said bell crank shaped cam bears against the lower face of the other cam, the said presser bar is brought to bear on card board when said knife blade cuts the same into strips.

8. In a box making machine the combination of a slide plate, flexible means tending to raise the plate, a presser bar flexibly connected to the lower end of said slide plate, a block fastened to the slide plate, a bell crank shaped cam having a pair of arms pivoted to the supporting plate, a cam for one of said arms, a knife blade holder with one end pivoted in the machine, a knife blade for the holder, means to actuate said holder, an arm fastened to the said knife blade holder, a cam for the latter arm, the cams disposed so that the bell crank shaped cam is adapted to ride around the other cam and when said bell crank shaped cam bears against the lower face of the other cam, the said presser bar is brought to bear on card board as said knife blade cuts the same into strips.

9. In a box making machine, the combination of a slide plate, means tending to raise the plate, a presser bar flexibly connected to the lower end of the slide plate, a bell crank shaped cam having a pair of arms pivoted to the machine, one of the arms of the bell crank shaped cam tending to lower the slide plate, a cam for the other arm, a knife blade holder with one end pivoted in the machine, a knife blade for the holder, an arm fastened to the said holder, a cam for the latter arm, the bell crank shaped cam adapted to ride around the second cam, and when the said bell crank shaped cam bears against the lower face of the other cam the said presser bar is brought to bear on card board as said knife blade cuts the same into strips.

10. In a box making machine the combination of means to cut a card board into strips, a wing hinged below the card board and means to swing up said wing to raise the portion of the card board after the strip has been severed therefrom.

11. In a box making machine the combination of means to cut a card board into strips, a wing hinged below the card board, a rotatable groove cam in the machine, a lever with a pair of arms pivoted in the machine, one of said arms having a nose at one end thereof adapted to swing up said wing and a roller at the other end of the other arm of said lever engaging the groove of said cam.

12. In a box making machine the combination of a cross shaft, means to oscillate the cross shaft, a pair of arms extending from the cross shaft, a link with its upper end in connection with one of said arms, a supporting plate fastened to the frame of the machine, a guide bracket adjustably connected to the supporting plate, a slide bar slidably supported in the guide bracket, a spring with its lower end fastened to the slide bar and its upper end fastened to the guide bracket, a second link with its upper end in adjustable connection with said second arm, said link having an elongated slot, a pin extending from said slide bar and engaging said slot, a knife blade connected to the lower end of the slide bar, a stationary blade extending from the frame of the machine and coacting with the knife blade of said slide bar to insert a cut partially through the paper strip, a second link in connection with said second arm, a second guide bracket adjustably connected to said supporting plate, a second slide bar slidably supported in the second guide bracket, a spring with its lower end fastened to the second slide bar and its upper end fastened to the frame of the machine, a pin extending from the lower end of the slide bar, a stationary cutting blade fastened to the pin of said second slide bar, a bracket extending from said supporting plate, an arm with one end pivoted to the latter bracket, a second link with one end pinned to the other end of the latter arm and an oscillating blade pivoted on the pin of the second slide bar with one end thereof connected to said second link and coacting with the stationary blade of the second slide bar, the latter blades inserting a cut all the way across the paper strip simultaneously with the other cut made in said strip.

13. In a box making machine the combination of a cross shaft, means to oscillate the shaft, a pair of arms extending from said shaft, a pair of links in connection with said arms disposed that the distance between said links can be varied, cutting means coacting with the lower ends of said links to simultaneously cut a paper strip in two different portions thereof.

14. In a box making machine the combination of a cross shaft, means to oscillate the cross shaft, a pair of arms extending from the cross shaft, a pair of links in adjustable lateral adjustment with the swinging ends of said arms, slide bars to guide the lower ends of said links, a knife blade in connection with the lower end of one of said links, a stationary knife blade extending from the frame of the machine coacting with the first knife blade to insert a cut partially across a paper strip, a pair of shears with one of its blades connected to the lower end of the second slide bar and the other blade of the shears in connection with the lower end of the second link to sever said paper strip completely across its width.

15. In a box making machine the combination of a frame, a supporting member in the frame for the neck of a box in the process of manufacture, a reciprocating slide bar guided in the machine, means to clamp one end of said neck connected to the slide bar, and means to vary the strokes of said slide bar to locate the clamping means in proper position for said neck.

16. In a box making machine the combination of a frame, a supporting member in the frame for the neck of a box in process of manufacture, a slide bar guided in the machine, means to clamp one end of said neck connected with the slide bar, a stationary groove cam supported in the machine, a rotatable disc adjacent to the cam, a slide guided on said disc, a roller extending from said slide engaging the groove of said groove cam, means to adjust the location of said roller relatively to the slide, a connecting rod in the machine, a pin connecting one end of said connecting rod to the slide bar and a screw pivot connecting the other end of the connecting rod to the slide on said disc.

17. In a box making machine the combination of a frame having a horizontal connecting portion, a slide bar guided in said connecting portion, a bracket supported on said connecting portion, an arm pivoted to said bracket, a stop pin extending from said bracket in the path of said arm, means to reciprocate said slide bar, a clamping finger with one end fastened to the slide bar, a clamping finger pivoted to the first finger, the latter finger having a nose formed therewith coacting with said arm when the slide bar is located at one end of the stroke, to swing open the pivoted clamping finger, a spring with its ends connected to said clamping fingers, and a roller journaled to said horizontal portion coacting with said nose when the slide bar is located at the other end of its stroke, to again swing open the pivoted clamping finger.

18. In a box making machine the combination of a slide bar, means to reciprocate said slide bar, a clamping finger with one end fastened to the slide bar, a second clamping finger pivoted to the first finger, a spring with its ends fastened to said clamping finger to tend to maintain them in their closed position and means to open said clamping fingers at the ends of the stroke of said slide bar, said fingers adapted to clamp one end of the neck of a box in the process of manufacture.

19. In a box making machine, the combination of a stationary forming block for the neck of a box in the process of manufacture, a slide guided below the forming block, means to reciprocate the slide, a bar supported at the top end of said slide, said bar adapted to support a portion of a neck for said box and to contact said portion against the bottom face of the forming block, a spring for the slide tending to raise the same, a slide plate with a projection, and angle bracket on said slide adapted to coact with said projection to lower the slide, bending members with one end each pivoted to the bar of said slide, each bending member having slots, pins extending from said slide plate engaging said slots, said bending members swinging up with the up strokes of the slide plate, a presser bar flexibly supported on each bending member, said presser bar forcing portions of the neck against the side faces of the stationary forming block, an arm extending from one of said bending members, a roller journaled in the outer end of said arm, said roller adapted to force a portion of said neck to the top face of said forming block.

20. In a box making machine, the combination of a stationary forming block for the neck of a box in the process of manufacture, a reciprocating bar below said forming block adapted to support a portion of a neck for said box and to contact said portion against the bottom face of the forming block, bending members with one end of each pivoted to said bar, a presser bar flexibly supported on each bending member, means to swing said bending members to locate portions of said neck against the side faces of the forming block, an arm extending from one of said bending members to force a portion of said neck to the top face of said forming block.

21. In a box making machine, the combination of a stationary forming block for the neck of a box in the course of manufacture, a lever adapted to swing above the forming block, a roller journaled to the end of the lever, adapted to roll on and bear against the flap of the paper strip at one end of the neck to locate it in proper position against the other end of the neck.

22. In a box making machine the combination of a stationary forming block for the neck of a box in the process of manufacture, a lever adapted to swing above the forming block, a cross bar flexibly supported at the end of the lever adapted to bear on the member of the neck at one of its ends and adjacent to a corner of the stationary forming block.

23. In a box making machine the combination of a stationary forming block for movably supporting the neck of a box and for inserting said neck in the body portion of the said box, said forming block having longitudinal grooves in its walls, a small projection in each one of said grooves adjacent to one end of the forming block, a slide block coacting with said forming block, springs with one end each fastened to said slide block, each of said springs having fastened adjacent to its other end a guide block adapted to engage the grooves of the stationary forming block, an angle bracket fastened to the sides of the forming block adapted to position the said neck located thereon, the ends of the springs bearing against said neck to locate it in position in the body portion of a box adjacent to one end of the said stationary forming block.

24. In a box making machine the combination of a chute to lead the body portion of a box in the course of manufacture to the appurtenances of said machine, a platform for the machine, a frame extending up from the platform, a guide plate fastened to said frame below said chute, horizontal guide plates fastened to said guide plate, a guide plate fastened to one of the horizontal guide plates to guide the body portion of the box as it leaves said chute, means to horizontally move the said body portion on said horizontal guide plates and movable fingers actuating over said horizontal guide plates.

25. In a box making machine the combination of a chute to lead body portions of boxes in the course of manufacture, means to vertically guide said body portions as they leave said chute, means to horizontally move said body portion and means to guide said body portions as they move horizontally.

26. In a box making machine the combination of a reciprocating slide, guide plates for the slide, a member carried by said slide, a lever pivoted to said member in a plane at right angles to the slide, a second slide pivoted to the upper end of said lever, fingers extending from one end of the second slide, a spring with one end bearing against one end wall of an opening in the second slide and its other end bearing against a projection extending from said member to move the second slide in one direction, a second lever pivoted to the bottom end of the first lever, a cam extending from one of the guide plates of said first slide coacting with said second lever to move the latter against the tension of said spring and move the said slide in a reversed direction.

27. In a box making machine the combination of a reciprocating slide, an oscillating lever moving with said slide, a second slide at right angles to the first slide in connection with one end of said lever, said second slide having fingers to move a box in the course of manufacture, a spring coacting with said second slide to move it in one direction, a second lever pivoted to the first lever, and a cam coacting with said second lever to move the second slide in a direction opposite to that produced by said spring.

28. In a box making machine the combination of a platform, a frame extending up from the platform, a bending arm adjustably connected to said frame, and located in the path of a box in the course of manufacture to bend a flap extending from the neck of said box.

29. In a box making machine the combination of a guide plate having upper and lower guide members for a box and its neck, in the course of manufacture, a reciprocating slide in the machine, slide bars extending from the slide, a plate connecting the outward ends of the bars, a bar having an axial guide opening with one end fastened to said plate, a plunger having a shank, said shank guided in said axial opening, a spring bearing between the end of said opening and the end of said shank, a block slidably supported on the bar having an axial opening, springs with one end of each fastened to said block, an angular member fastened to the other end of each spring on the outer face thereof, and a shoe fastened to the inner face thereof, said shoes coacting with said plunger, when the slide is moving in one direction to press said neck in place.

30. In a box making machine the combination of a guide plate having upper and lower guide members for a box with its neck in the course of manufacture, a reciprocating plunger coaxial with said box, springs with one end each slidably supported at the sides of said plunger and means for the other ends of the springs to bear against the inner faces of said neck to press it against the body portion of the box, said means controlled by said plunger.

31. In a box making machine the combination of a reciprocating slide, a slide rod guided in the machine, a spring moving said slide rod in one direction and its coaction with said slide moving it in the opposite direction, a stationary clamping jaw supported in the machine adjacent to one end of the slide rod, an oscillating clamping jaw pivoted to the stationary clamping jaw, a flexible connection between said slide rod and said oscillating jaw, said jaws adapted to fold the flap of a neck in place in said box.

32. In a box making machine the combination of a guide plate having upper and lower guide members for a box and its neck in the course of manufacture, a reciprocating slide in the machine, a platform for the machine, a frame supported on the platform, plungers guided in openings in said frame and adapted to bear against the body portion of the box, said plungers actuating when said slide moves in one direction to eject the box from said guide members.

33. The method of making a box consisting in locating a strip of card board over a paper web, said web having an adhesive on its upper face, the forward edge of the card board spaced back of the forward edge of the paper web, pressing the cardboard and paper web together, one end of the paper web in line with one end of the strip of card board, the other end of the web extending beyond the other end of the strip of card board and having a cut therein, the latter end of the paper web constituting a lip, folding the portion of the paper web between its cut and its other end over the forward side of the card board strip and pressing the folded over portion of the web to said card board strip, locating adhesive to the bottom face of the paper web and card board strip, next shaping both the paper web and card board strip to form a neck, then bending the lip over one corner of the neck, locating a body portion for the box into the neck and finally locating said lip against the inner face of the neck and pressing said neck against the body portion of the box.

34. The method of making a box consisting in locating a strip of card board over a paper web having an adhesive on its upper face, the forward edge of the card board spaced back of the forward edge of the paper web, pressing the card board and paper web together, one end of the paper web in line with one end of the strip of card board, the other end of the web extending beyond the other end of the strip of card board and having a cut therein, the latter end of the paper web constituting a lip, folding the portion of the paper web between its cut and its other end over the forward side of the card board strip and pressing the folded over portion of the web to said card board strip, locating adhesive to the bottom face of the paper web and card board strip, next shaping both the paper web and card board strip to form a neck, then bending the lip over one corner of the neck, locating a body portion for the box into the neck, reducing its size while entering said neck, bending the lip of the paper web over the edge of the neck and finally bending said lip against the inner face of the neck and pressing said neck against the body portion of the box.

In testimony whereof I affix my signature.

LOUIS TRIOLO.